(12) United States Patent
Sakamaki et al.

(10) Patent No.: US 11,425,276 B2
(45) Date of Patent: Aug. 23, 2022

(54) ELECTRONIC DEVICE

(71) Applicant: FUJIFILM Business Innovation Corp., Tokyo (JP)

(72) Inventors: Tadamasa Sakamaki, Kanagawa (JP); Kenji Kuroishi, Kanagawa (JP); Ryoto Shirasaka, Kanagawa (JP); Hidejiro Shikaze, Kanagawa (JP); Takafumi Hayase, Kanagawa (JP); Tokuji Ueda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 547 days.

(21) Appl. No.: 16/186,607

(22) Filed: Nov. 12, 2018

(65) Prior Publication Data
US 2019/0158684 A1 May 23, 2019

(30) Foreign Application Priority Data

Nov. 21, 2017 (JP) .............................. JP2017-223943

(51) Int. Cl.
*H04N 1/00* (2006.01)
*H04N 1/21* (2006.01)
(Continued)

(52) U.S. Cl.
CPC ........... *H04N 1/2104* (2013.01); *G06F 12/00* (2013.01); *G06F 13/4221* (2013.01); *H04N 1/00952* (2013.01); *H04N 1/0097* (2013.01)

(58) Field of Classification Search
None
See application file for complete search history.

(56) References Cited

U.S. PATENT DOCUMENTS 7,423,920 B2 * 9/2008 Koo .................. G11C 7/1051
365/194
8,429,324 B2 * 4/2013 Ushigami .............. G06F 13/28
710/315
(Continued)

FOREIGN PATENT DOCUMENTS

JP 2011138465 7/2011
JP 2012043025 3/2012
(Continued)

OTHER PUBLICATIONS

"Office Action of Japan Counterpart Application", dated May 18, 2021, with English translation thereof, pp. 1-9.
(Continued)

*Primary Examiner* — Elias Mamo
(74) *Attorney, Agent, or Firm* — JCIPRNET

(57) ABSTRACT

An electronic device includes a first controller compliant with a first storage standard, a second controller compliant with a second storage standard, a switching unit that switches setting information between first setting information corresponding to the first storage standard and second setting information corresponding to the second storage standard, and a connection establishing unit that executes processing of establishing connection between an external storage device and one of the first controller or the second controller, the one of the first controller or the second controller compliant with the setting information set by the switching of the switching unit.

13 Claims, 15 Drawing Sheets

(51) Int. Cl.
*G06F 12/00* (2006.01)
*G06F 13/42* (2006.01)

(56) References Cited

U.S. PATENT DOCUMENTS

| | | | | |
|---|---|---|---|---|
| 8,943,234 B1* | 1/2015 | Voorhees | ............... | G06F 3/0653 |
| | | | | 710/17 |
| 2006/0041703 A1* | 2/2006 | Tseng | .................... | G06F 13/387 |
| | | | | 710/306 |
| 2011/0167177 A1 | 7/2011 | Kouyama et al. | | |
| 2012/0265918 A1 | 10/2012 | Nakajima et al. | | |
| 2013/0013842 A1 | 1/2013 | Numamoto et al. | | |
| 2014/0223064 A1* | 8/2014 | Wang | .................. | G06F 13/4027 |
| | | | | 710/301 |
| 2015/0186317 A1* | 7/2015 | Kaufmann | .......... | G06F 13/4027 |
| | | | | 710/306 |
| 2015/0261712 A1* | 9/2015 | Numamoto | ........... | G06F 13/387 |
| | | | | 710/316 |
| 2016/0062652 A1* | 3/2016 | Hia | ....................... | G06F 3/0659 |
| | | | | 711/102 |
| 2016/0306763 A1* | 10/2016 | Geva | .................. | G06F 13/4022 |

FOREIGN PATENT DOCUMENTS

| | | |
|---|---|---|
| JP | 2012226407 | 11/2012 |
| JP | 2013016096 | 1/2013 |
| JP | 2017173446 | 9/2017 |

OTHER PUBLICATIONS

"Office Action of Japan Counterpart Application" with English translation thereof, dated Sep. 14, 2021, p. 1-p. 7.

* cited by examiner

ELECTRONIC DEVICE

CROSS-REFERENCE TO RELATED APPLICATIONS

This application is based on and claims priority under 35 USC 119 from Japanese Patent Application No. 2017-223943 filed Nov. 21, 2017.

BACKGROUND

(i) Technical Field

The present disclosure relates to an electronic device.

(ii) Related Art

For example, Japanese Unexamined Patent Application Publication No. 2011-138465 discloses a storage device body 100 including a body-side connector 130 to which a cartridge type HDD 200 is connected and which has a shape compliant with a SATA standard, a SATA controller 140 that communicates with the cartridge type HDD 200 in compliance with the SATA standard by using a body-side SATA signal connector part 120 provided in the body-side connector 130, and a USB controller 180 that communicates with the cartridge type HDD 200 in compliance with a USB standard by using 3.3V pins of a body-side SATA power connector part 110 provided in the body-side connector 130.

SUMMARY

Aspects of non-limiting embodiments of the present disclosure relate to the following case. In order to establish connection to an external storage device, a connection path and a connector to the external storage device may be provided for each of a plurality of storage standards. In this case, the storage standard that is not supported by the external storage device is not used for the connection to the external storage device but a connection path and a connector are also provided for the unused storage standard. Thus, an additional cost is required.

Aspects of non-limiting embodiments of the present disclosure also relate to reduction of a cost necessary to establish the connection to the external storage device compared with the configuration in which the connection path and the connector to the external storage device are provided for each of the plurality of storage standards.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an electronic device comprising a first controller compliant with a first storage standard, a second controller compliant with a second storage standard, a switching unit that switches setting information between first setting information corresponding to the first storage standard and second setting information corresponding to the second storage standard, and a connection establishing unit that executes processing of establishing connection between an external storage device and one of the first controller or the second controller, the one of the first controller or the second controller compliant with the setting information set by the switching of the switching unit.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure are described below in detail with reference to the accompanying drawings.

First Exemplary Embodiment

An image forming apparatus is described as an example. The image forming apparatus described in the first exemplary embodiment is an apparatus that forms an image on a recording material (hereinafter may be referred to as "paper") and has a copying function, a scanning function, a facsimile transmission/reception function, a printing function, and the like.

The image forming apparatus need not have all the functions but may be a specialized apparatus having any one of the functions, such as a copying machine, a scanner (including a three-dimensional scanner), a facsimile transceiver, or a printer (including a three-dimensional printer).

<Schematic Configuration of Image Forming Apparatus>

First, the schematic configuration of an image forming apparatus 1 is described.

Figure 1:
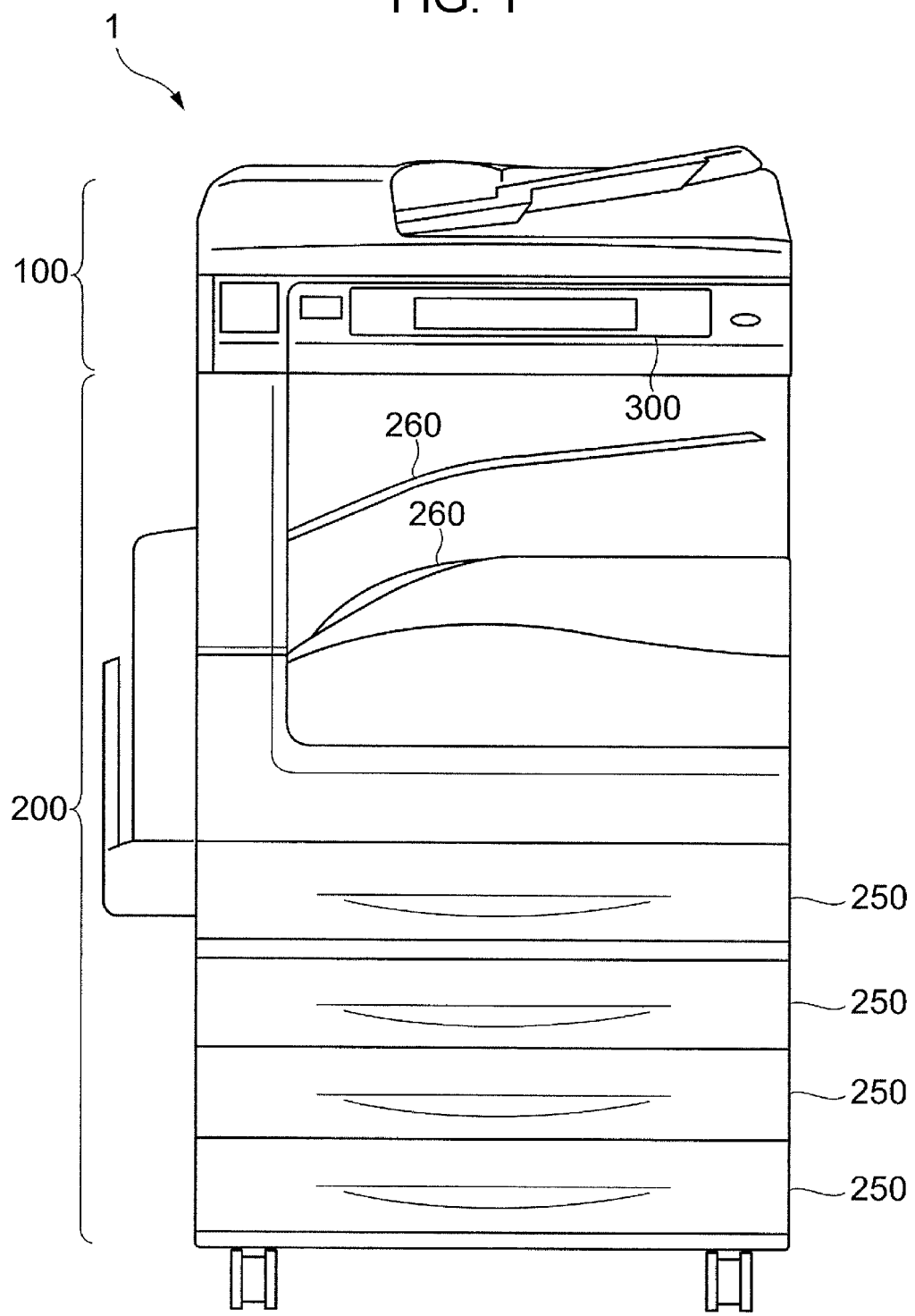
FIG. 1 illustrates an example of the appearance of an image forming apparatus according to a first exemplary embodiment.
Figure 2:
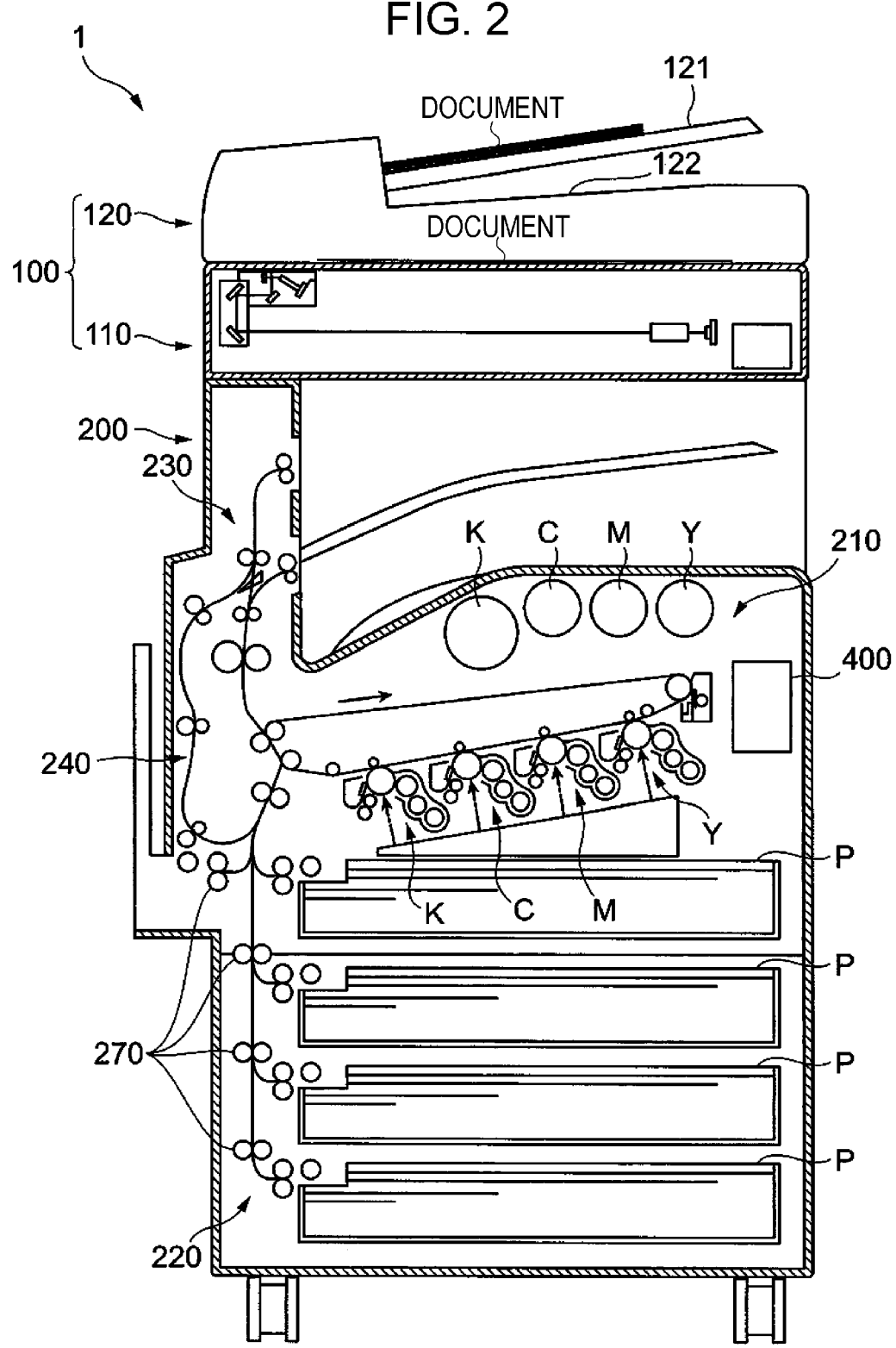
FIG. 2 illustrates an example of the internal configuration of the image forming apparatus according to the first exemplary embodiment.

FIG. 1 illustrates an example of the appearance of the image forming apparatus 1 according to the first exemplary embodiment. FIG. 2 illustrates an example of the internal configuration of the image forming apparatus 1 according to the first exemplary embodiment.

The image forming apparatus 1 includes an image reading device 100 that reads an image on a document, and an image recording device 200 that records an image on paper.

The image forming apparatus 1 includes a user interface (UI) 300 to be used for receiving a user's operation and providing various type of information for the user. The image forming apparatus 1 further includes a control device 400 that controls the overall operation of the image forming apparatus 1.

The image forming apparatus 1 is an example of an image processing system.

The image reading device 100 is mounted on the image recording device 200 that constitutes a body of the apparatus. The image reading device 100 includes an image reading part 110 that optically reads an image formed on a document, and a document transport part 120 that transports a document to the image reading part 110. The document transport part 120 includes a document receiving part 121 where documents are received, and a document output part 122 where a document pulled out of the document receiving part 121 is output. The document transport part 120 transports the document from the document receiving part 121 to the document output part 122 by using a transport mechanism (not illustrated). The document transport part 120 is also referred to as an auto document feeder (ADF). The image on the document may be read by moving an optical reading system relative to the document.

The image recording device 200 includes a mechanism that forms an image on the surface of paper, and a mechanism that transports paper.

The image recording device 200 includes an image forming part 210 that forms an image on paper P pulled out of a paper tray 250, a paper feeding part 220 that feeds the paper P to the image forming part 210, a paper output part 230 that outputs the paper P on which the image is formed by the image forming part 210, and a reversal transport part 240 that reverses the paper P output from the image forming part 210 and transports the paper P toward the image forming part 210 again.

In the image forming part 210, recording units corresponding to yellow (Y), magenta (M), cyan (C), and black (K) are arranged along a transport path of the paper P. In this exemplary embodiment, the image forming part 210 is used as an example of an image forming unit that forms an image on a recording material based on image data.

Each recording unit includes a photoconductor drum, a charging device that charges the surface of the photoconductor drum, an exposure part that renders an image by radiating a laser beam onto the charged photoconductor drum, a developing device that develops the rendered image as a toner image, and a transfer part that transfers the toner image onto a transfer belt. The toner images that correspond to the respective colors and are transferred onto the transfer belt are finally transferred onto the surface of the paper P and fixed by a fixing unit. The types of color and the combination thereof are examples.

The paper trays 250 that contain sheets of the paper P are arranged at a lower portion of the image recording device 200. A plurality of output trays 260 where the paper P on which the image is formed is output are provided at an upper portion of the image recording device 200.

The user interface 300 is arranged at the front of the image reading device 100 so that an operation panel of the user interface 300 faces the user who operates the image forming apparatus 1.

The user interface 300 has an operation part that receives an instruction from the user, and a display part that provides information for the user. For example, the operation part has a function of detecting an operation for hardware or software keys. For example, the display part displays software keys as an operation screen.

The control device 400 is provided inside a housing of the image recording device 200.

Figure 3:
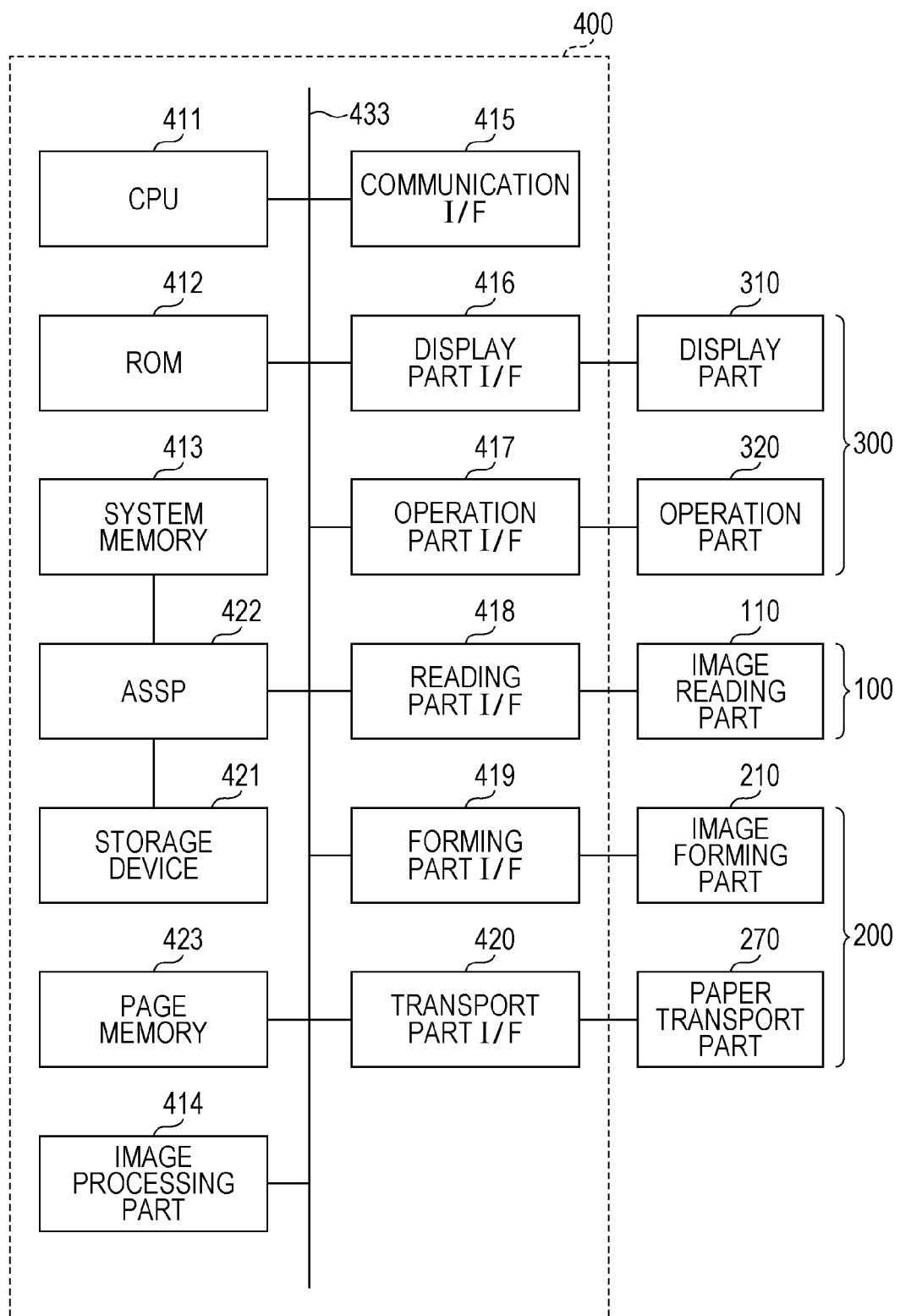
FIG. 3 illustrates a connection relationship between a control device and other components.

FIG. 3 illustrates a connection relationship between the control device 400 and other components.

The control device 400 includes a central processing unit (CPU) 411, a read only memory (ROM) 412 that stores firmware (program), a basic input/output system (BIOS), and the like, and a system memory 413 that is a volatile memory to be used as a working area for the CPU 411. Those components constitute a general computer. The CPU 411 functions as a data processing part by executing the firmware (program) or the like.

The control device 400 includes an image processing part 414 that executes various types of processing (for example, color correction and tone correction) necessary to form an image. The image processing part 414 executes image processing by using the system memory 413 or the like.

The control device 400 is provided with interfaces (I/Fs) to be used for exchanging data with external devices. For example, the control device 400 is provided with a communication interface (communication I/F) 415 to be used for communicating with external terminals, a display part interface (display part I/F) 416 that outputs image data to a display part 310, an operation part interface (operation part I/F) 417 to which data related to an operation received by an operation part 320 is input, a reading part interface (reading part I/F) 418 to which image data is input from the image reading part 110, a forming part interface (forming part I/F) 419 that outputs image data to the image forming part 210, and a transport part interface (transport part I/F) 420 that outputs data for driving a paper transport part 270.

The control device 400 is also provided with a nonvolatile storage device 421. Examples of the storage device 421 include a hard disk drive (HDD) and a solid state drive (SSD). For example, the storage device 421 stores image data to be used for image formation executed by the image forming part 210. In this exemplary embodiment, the storage device 421 is used as an example of an external storage device.

The control device 400 is also provided with an application specific standard product (ASSP) 422 that functions as an interface to be used for exchanging data with the storage device 421. The ASSP 422 also functions as an interface to be used for exchanging data with the system memory 413. The ASSP 422 is an integrated circuit board having a specific function and purpose and executes processing of establishing connection to the storage device 421. Details are described later.

The control device 400 is also provided with a page memory 423 that is a volatile memory that stores image data. The page memory 423 stores the image data for each predetermined size, in other words, for each page. The image data stored in the page memory 423 is output sequentially and, for example, image formation is executed by the image forming part 210 based on the output image data.

The CPU 411 and the respective parts are connected to each other through a bus 433. As the bus 433, a plurality of buses may be connected to each other via a bridge.

In this exemplary embodiment, the ASSP 422 and a SERializer/DESerializer (SERDES) switch 424 described later are used as examples of an electronic device. If the storage device 421 is provided outside the control device 400, the control device 400 may be regarded as an example of the electronic device.

Figure 4:
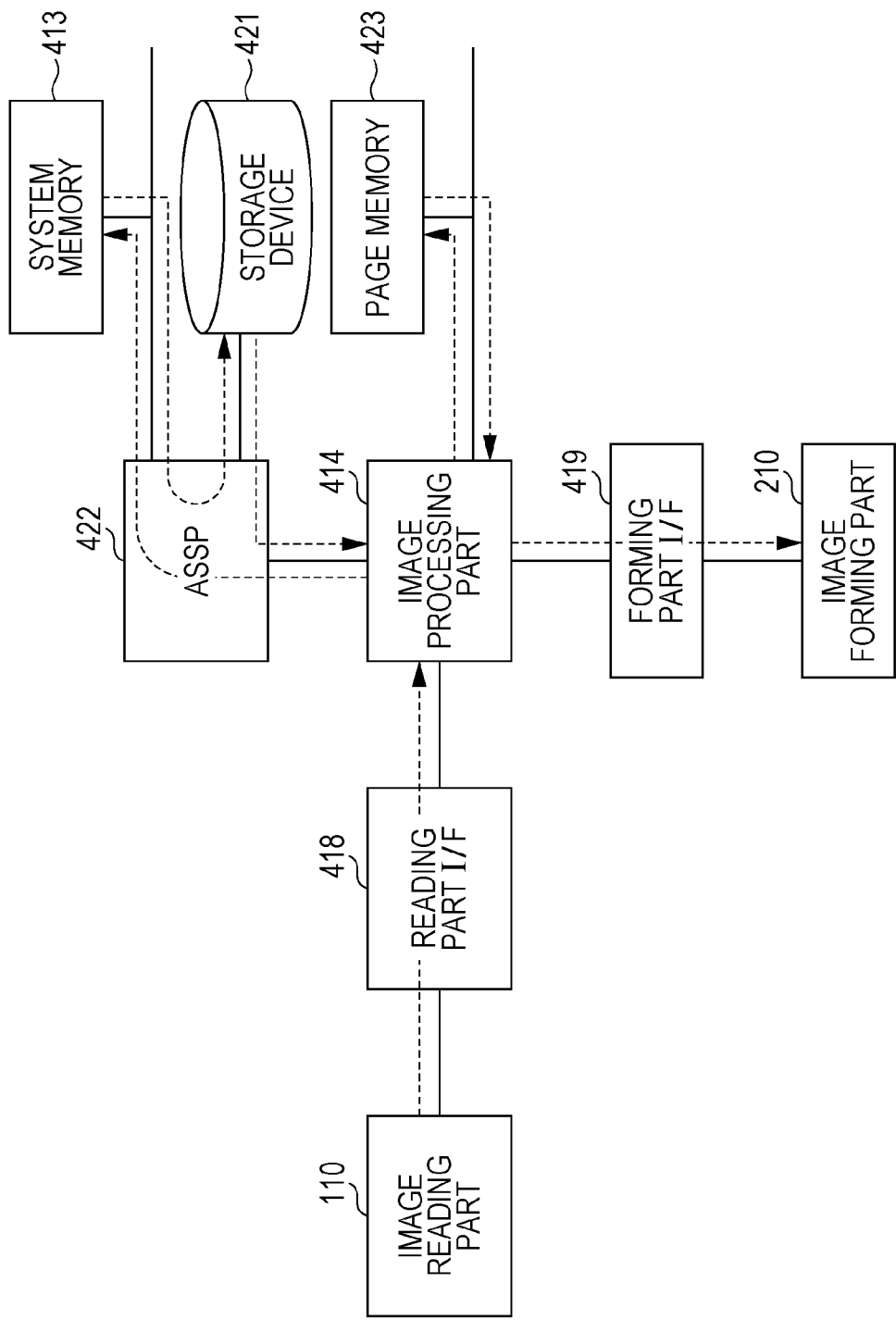
FIG. 4 illustrates an example of a flow of processing of transferring image data in the image forming apparatus.

FIG. 4 illustrates an example of a flow of processing of transferring image data in the image forming apparatus 1. As an example, description is made of a case in which the image forming apparatus 1 executes the copying function.

First, the image reading part 110 reads an image formed on a document to generate image data. The generated image data is input to the image processing part 414 via the reading part I/F 418 and is processed by the image processing part 414 as necessary. The processed image data is temporarily stored in the system memory 413 via the ASSP 422.

Then, the image data is temporarily stored in the storage device 421 from the system memory 413 via the ASSP 422. As necessary, the image data stored in the storage device 421 is processed by the image processing part 414, sequentially stored in the page memory 423, and then transferred to the image forming part 210 via the forming part I/F 419. Then, the image forming part 210 forms an image on the paper P based on the image data.

<Connection Relationship Between ASSP and Storage Device>

Figure 5:
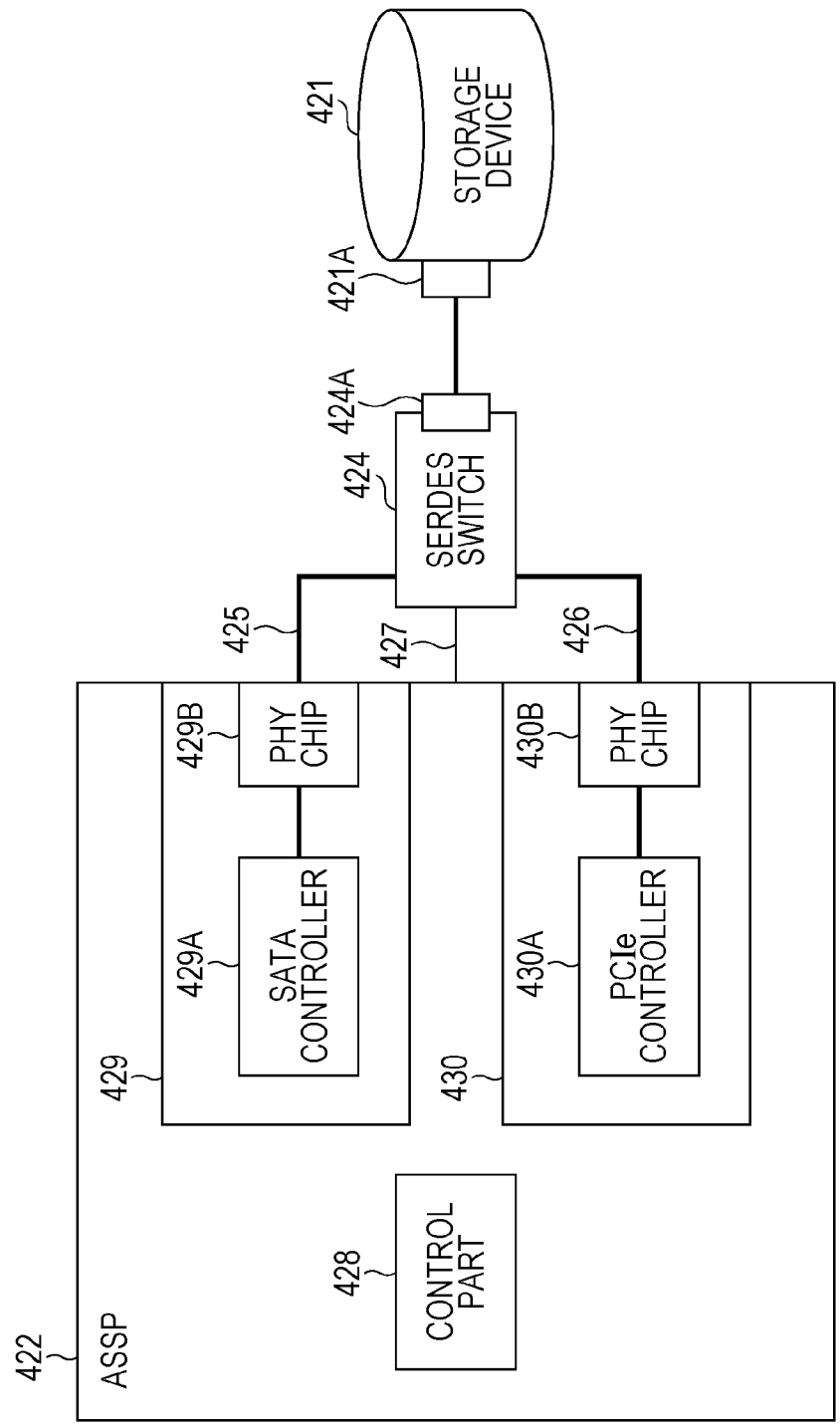
FIG. 5 illustrates an example of a connection relationship between an ASSP and a storage device according to the first exemplary embodiment.

Next, a connection relationship between the ASSP 422 and the storage device 421 is described. FIG. 5 illustrates an example of the connection relationship between the ASSP 422 and the storage device 421 according to the first exemplary embodiment.

Serial advanced technology attachment (SATA) and PCI Express (PCIe) are used as connection standards (storage standards) for connecting the storage device 421. SATA is a half-duplex serial transfer interface. For example, the transfer rate of SATA is 6 Gbps as a physical transfer rate and is 4.8 Gbps as an actual effective transfer rate. PCIe is a full-duplex serial transfer interface. For example, the transfer rate of PCIe is 10 Gbps as a physical transfer rate and is 8 Gbps as an actual effective transfer rate. In a case of using four lanes, the effective transfer rate is 32 Gbps. Thus, the transfer rate of PCIe is generally higher than that of SATA and PCIe may simultaneously execute bidirectional communications by full-duplex communication.

SATA has been used as an interface for an HDD, an SSD, or the like. By using PCIe, the transfer rate is improved in many cases. In this exemplary embodiment, the ASSP 422 is compliant both with SATA and with PCIe and the connection between the ASSP 422 and the storage device 421 is established by switching the connection standard to SATA or PCIe depending on the connection standard of the storage device 421. In this exemplary embodiment, SATA is used as an example of a first storage standard. PCIe is used as an example of a second storage standard.

The ASSP 422 is connected to the storage device 421 via the SERDES switch 424. A SATA bus 425 to be used in the case of connection by SATA and a PCIe bus 426 to be used in the case of connection by PCIe are provided as connection paths between the ASSP 422 and the SERDES switch 424. The SERDES switch 424 switches the bus between the SATA bus 425 and the PCIe bus 426 as a connection path between the ASSP 422 and the storage device 421. In this exemplary embodiment, the SERDES switch 424 is used as an example of a switching unit.

Specifically, the SERDES switch 424 switches the standard between SATA and PCIe as a standard to be used for the connection between the ASSP 422 and the storage device 421. In other words, the SERDES switch 424 switches the interface between a SATA interface 429 and a PCIe interface 430 described later as an interface of the ASSP 422 to be connected to the storage device 421. That is, the SERDES switch 424 switches a controller between a SATA controller 429A and a PCIe controller 430A described later as a controller that controls the connection between the ASSP 422 and the storage device 421. Further, the SERDES switch 424 switches a parameter between a SATA parameter and a PCIe parameter described later as a parameter (setting information) to be used for the connection between the ASSP 422 and the storage device 421.

In this exemplary embodiment, the SERDES switch 424 switches the bus between the SATA bus 425 and the PCIe bus 426 but stubs are formed if both the buses are connected directly. The stub is a branched portion of a signal line. In general, a signal that enters the stub is reflected at the tip of the stub to return to a branch point, thereby canceling the original signal. Thus, troubles may occur in data transfer if the stub is formed. In this exemplary embodiment, data transfer by SATA or PCIe is achieved without forming the stub by switching the bus between the SATA bus 425 and the PCIe bus 426.

A bus 427 to be used for receiving a switching signal transmitted from the ASSP 422 is connected to the SERDES switch 424. Based on the switching signal received from the ASSP 422 via the bus 427, the SERDES switch 424 switches the connection path (that is, switches the connection standard, interface, controller, and parameter).

The SERDES switch 424 has a connector 424A that is a part connected to the storage device 421. The storage device 421 has a connector 421A that is a part connected to the SERDES switch 424.

Next, the internal configuration of the ASSP 422 is described. The ASSP 422 includes a control part 428, the SATA interface 429, and the PCIe interface 430.

The control part 428 controls an overall operation of the ASSP 422.

The SATA interface 429 is an interface compliant with SATA. The SATA interface 429 includes the SATA controller 429A that executes control so as to establish connection to the storage device 421 by SATA, and a PHY chip 429B that executes processing such as serial-to-parallel conversion by connecting the SATA controller 429A to the storage device 421.

Specifically, a parameter to be used for establishing the connection to the storage device 421 by SATA (hereinafter referred to as a SATA parameter) is set in the PHY chip 429B in advance. The connection between the SATA controller 429A and the storage device 421 is established by using the SATA parameter. In this exemplary embodiment, the SATA controller 429A is used as an example of a first controller. The SATA parameter is used as an example of first setting information corresponding to the first storage standard. The PHY chip 429B is used as an example of a first memory.

The PCIe interface 430 is an interface compliant with PCIe. The PCIe interface 430 includes the PCIe controller 430A that executes control so as to establish connection to the storage device 421 by PCIe, and a PHY chip 430B that executes processing such as serial-to-parallel conversion by connecting the PCIe controller 430A to the storage device 421.

Specifically, a parameter to be used for establishing the connection to the storage device 421 by PCIe (hereinafter referred to as a PCIe parameter) is set in the PHY chip 430B in advance. The connection between the PCIe controller 430A and the storage device 421 is established by using the PCIe parameter. In this exemplary embodiment, the PCIe controller 430A is used as an example of a second controller. The PCIe parameter is used as an example of second setting information corresponding to the second storage standard. The PHY chip 430B is used as an example of a second memory.

<Functional Configuration of Control Part of ASSP>

Figure 6:
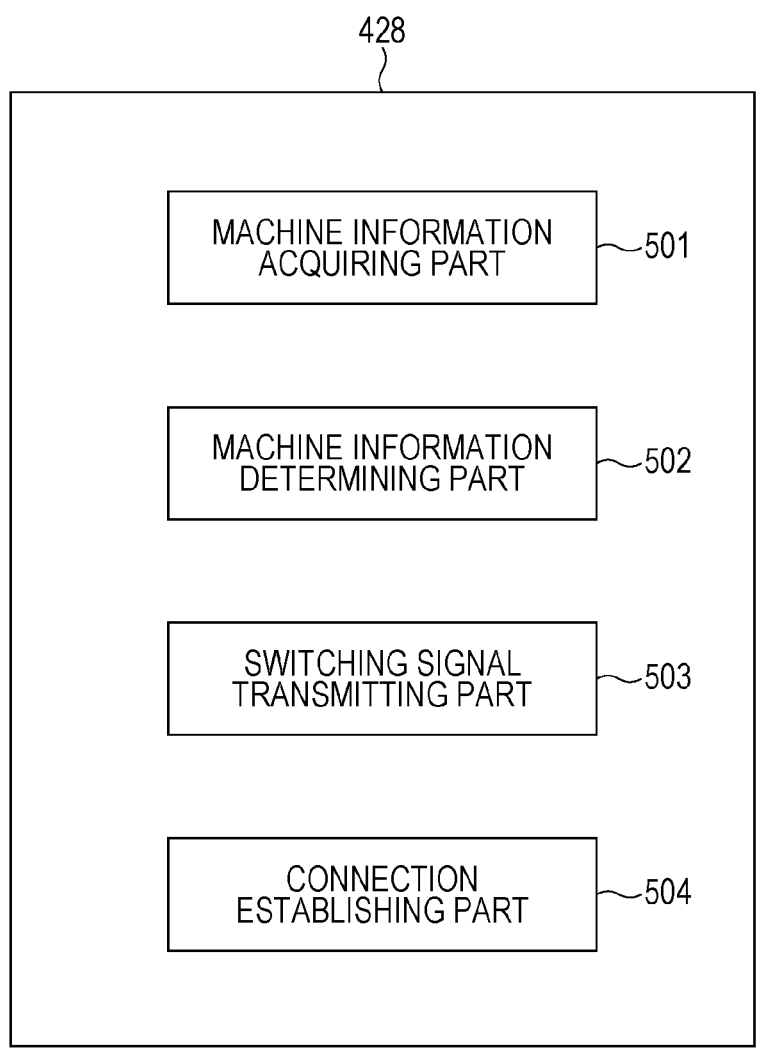
FIG. 6 is a block diagram illustrating an example of the functional configuration of a control part of the ASSP according to the first exemplary embodiment.

Next, the functional configuration of the control part 428 of the ASSP 422 is described. FIG. 6 is a block diagram illustrating an example of the functional configuration of the control part 428 of the ASSP 422 according to the first exemplary embodiment. The control part 428 includes a machine information acquiring part 501, a machine information determining part 502, a switching signal transmitting part 503, and a connection establishing part 504.

For example, the machine information acquiring part 501 acquires machine information stored in a non-volatile storage part (not illustrated) provided inside or outside the ASSP 422 when the image forming apparatus 1 is activated. The machine information is information to be used for switching the connection path. For example, the machine information is stored in the storage part at the time of factory shipment of the image forming apparatus 1. Examples of the machine information to be set include values of "SATA", "PCIe", and "Storage-less". For example, the value of "SATA" is set when the storage device 421 compliant with SATA is mounted on the image forming apparatus 1 or the value of "PCIe" is set by default irrespective of the type of the interface of the storage device 421.

"Storage-less" indicates a state in which no storage device 421 is present. In the configuration illustrated in FIG. 3, the image forming apparatus 1 includes the storage device 421 but this exemplary embodiment may be implemented also in a configuration in which the image forming apparatus 1 does not include the storage device 421.

The machine information may be in an unset state in which no specific value has been set yet.

The machine information determining part 502 makes determination on the value set as the machine information acquired from the storage part (not illustrated). More specifically, the machine information determining part 502 determines which of "SATA", "PCIe", "Storage-less", and "Unset" the machine information corresponds to.

Based on the determination made by the machine information determining part 502, the switching signal transmitting part 503 transmits, to the SERDES switch 424 via the bus 427, a switching signal for an instruction to switch the connection path.

More specifically, if the machine information determining part 502 determines that the machine information is "SATA", the switching signal transmitting part 503 transmits, to the SERDES switch 424 via the bus 427, a switching signal for an instruction to switch the connection path to the SATA side (SATA bus 425) (hereinafter referred to as a SATA switching signal). The SERDES switch 424 switches the connection path to the SATA side when the SATA switching signal is received.

If the machine information determining part 502 determines that the machine information is "PCIe", in other words, if the machine information determining part 502 determines that the machine information is neither "SATA" nor "Storage-less", the switching signal transmitting part 503 transmits, to the SERDES switch 424 via the bus 427, a switching signal for an instruction to switch the connection path to the PCIe side (PCIe bus 426) (hereinafter referred to as a PCIe switching signal). The SERDES switch 424 switches the connection path to the PCIe side when the PCIe switching signal is received.

If the machine information determining part 502 determines that the machine information has not been set yet, the switching signal transmitting part 503 transmits the SATA switching signal or the PCIe switching signal that is determined in advance to the SERDES switch 424 via the bus 427.

Based on the determination made by the machine information determining part 502, the connection establishing part 504 that is an example of a connection establishing unit executes processing of establishing connection between the ASSP 422 and the storage device 421. The processing to be executed by the connection establishing part 504 differs depending on the case in which the machine information determining part 502 determines that the machine information is "SATA", the case in which the machine information determining part 502 determines that the machine information is "PCIe", and the case in which the machine information determining part 502 determines that the machine information is "Storage-less".

First, description is made of the case in which the machine information determining part 502 determines that the machine information is "SATA".

If the machine information determining part 502 determines that the machine information is "SATA", the connection establishing part 504 initializes the SATA controller 429A and the PHY chip 429B. By initializing the SATA controller 429A and the PHY chip 429B, the SATA controller 429A executes processing of establishing connection to the storage device 421. If the storage device 421 is compliant with SATA in the state in which the connection path has been switched to the SATA side and the SATA controller 429A has executed the processing of establishing connection, the connection between the ASSP 422 and the storage device 421 is established by SATA. If the storage device 421 is not compliant with SATA, the connection is not established.

Then, the connection establishing part 504 determines whether the connection between the ASSP 422 and the storage device 421 has been established. If the connection establishing part 504 determines that the connection has been established, the connection establishing part 504 sets "SATA" as the machine information stored in the storage part. If the connection establishing part 504 determines that the connection has not been established, the connection establishing part 504 changes the machine information from "SATA" to "PCIe". If the processing of establishing connection by PCIe has not been executed yet in the state in which the machine information has been changed to "PCIe", the switching signal transmitting part 503 executes processing of transmitting the PCIe switching signal. If the processing of establishing connection by PCIe has already been executed, the connection is not established either by SATA or by PCIe. In this case, the connection establishing part 504 further changes the machine information to "Storage-less" to recognize that the storage device 421 is not present.

Next, description is made of the case in which the machine information determining part 502 determines that the machine information is "PCIe".

If the machine information determining part 502 determines that the machine information is "PCIe", the connection establishing part 504 initializes the PCIe controller 430A and the PHY chip 430B. By initializing the PCIe controller 430A and the PHY chip 430B, the PCIe controller 430A executes processing of establishing connection to the storage device 421. If the storage device 421 is compliant with PCIe in the state in which the connection path has been switched to the PCIe side and the PCIe controller 430A has executed the processing of establishing connection, the connection between the ASSP 422 and the storage device 421 is established by PCIe. If the storage device 421 is not compliant with PCIe, the connection is not established.

Then, the connection establishing part 504 determines whether the connection between the ASSP 422 and the storage device 421 has been established. If the connection establishing part 504 determines that the connection has been established, the connection establishing part 504 sets "PCIe" as the machine information stored in the storage part. If the connection establishing part 504 determines that the connection has not been established, the connection establishing part 504 changes the machine information from "PCIe" to "SATA". If the processing of establishing connection by SATA has not been executed yet in the state in which the machine information has been changed to "SATA", the switching signal transmitting part 503 executes processing of transmitting the SATA switching signal. If the processing of establishing connection by SATA has already been executed, the connection is not established either by SATA or by PCIe. In this case, the connection establishing part 504 further changes the machine information to "Storage-less" to recognize that the storage device 421 is not present.

Next, description is made of the case in which the machine information determining part 502 determines that the machine information is "Storage-less".

If the machine information determining part 502 determines that the machine information is "Storage-less", the connection establishing part 504 recognizes that the storage device 421 is not present. In this case, the image forming apparatus 1 operates as a storage-less configuration.

The image forming apparatus 1 operates as the storage-less configuration if the connection establishing part 504 recognizes that the storage device 421 is not present (for example, if the connection is not established either by SATA or by PCIe) irrespective of the case in which the machine information determining part 502 determines that the machine information is "Storage-less".

<Description of Parameters to be Used for Establishing Connection>

Next, description is made of the SATA parameter and the PCIe parameter to be used for establishing connection to the storage device 421. SATA and PCIe differ in terms of specifications of serial transfer and therefore settings compliant with the respective standards are necessary. Thus, the SATA parameter or the PCIe parameter is used. More specifically, those parameters differ in terms of a setting value related to data transfer.

For example, the SATA parameter and the PCIe parameter differ in terms of settings of impedance (or a drive length). That is, settings differ in terms of how much current is caused to flow. For example, the SATA parameter is set to 100 ohms and the PCIe parameter is set to 85 ohms.

For example, the SATA parameter and the PCIe parameter differ in terms of settings of pre-emphasis. The pre-emphasis is processing of adjusting the strength of a data signal by emphasizing a specific component of the data signal in order to improve the SN ratio, waveform characteristics, and the like of the signal received by a reception circuit. For example, a setting of reducing the transfer rate is executed depending on the condition of a circuit board of the ASSP 422 (revision of the circuit board or version of the circuit board). For example, if the impedance is 100 ohms in the SATA parameter, the transfer rate is changed depending on the condition of the circuit board of the ASSP 422 by setting −6 Gbps, −3.5 db (3 Gbps), or 0 db (1.5 Gbps). For example, if the impedance is 85 ohms in the PCIe parameter, the transfer rate is changed depending on the condition of the circuit board of the ASSP 422 by setting −6 db (8 Gbps) or −3.5 db (5 Gbps).

SATA and PCIe differ in terms of a power control method. Therefore, different values are set to parameters related to power control.

SATA and PCIe differ in terms of a serial transfer protocol. Therefore, when SATA and PCIe are switched therebetween, the protocol stack needs to be switched as well. The connection is established by processing in accordance with each standard.

<Procedure of Switching Connection Path>

Figure 7:
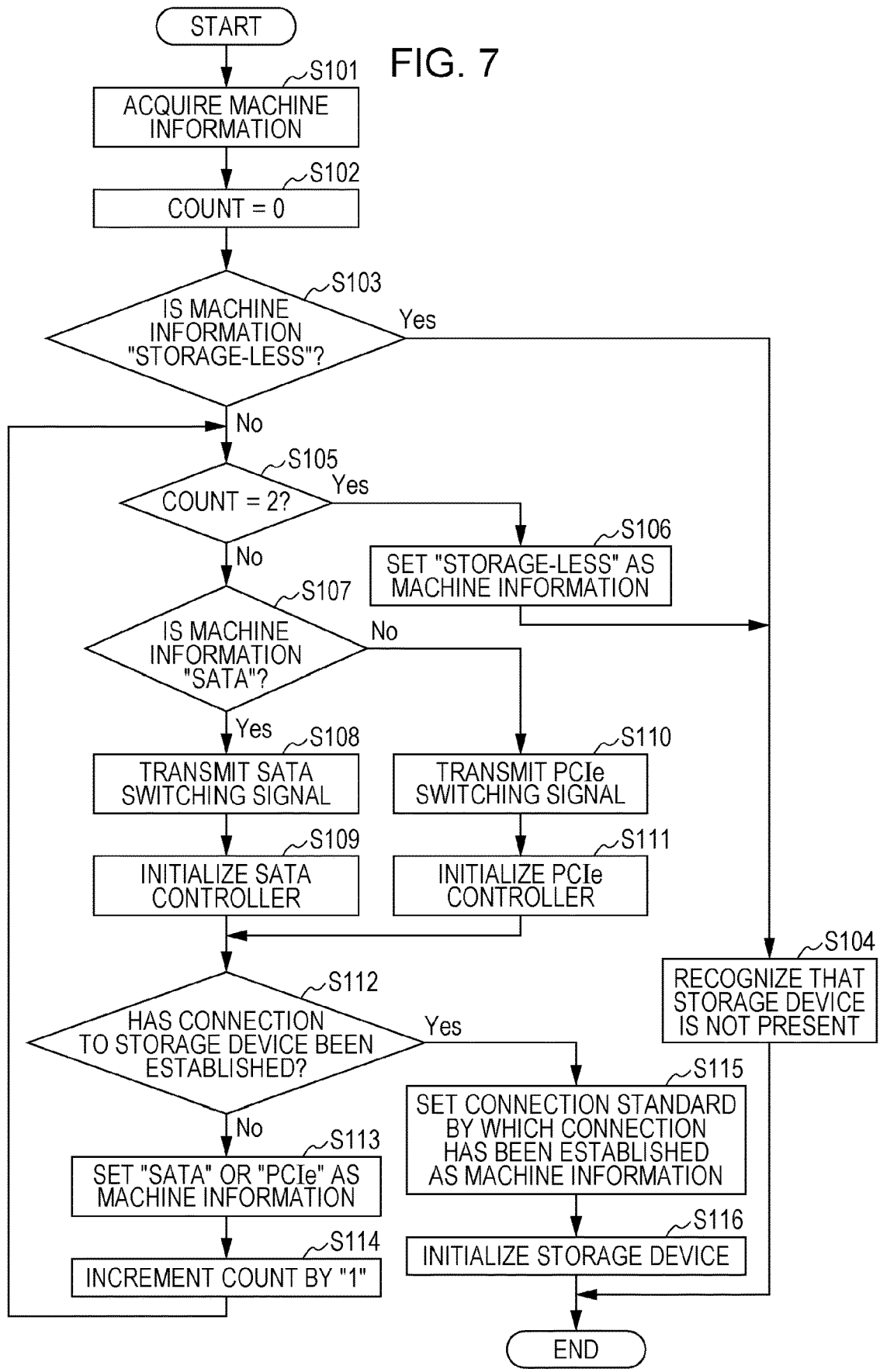
FIG. 7 is a flowchart illustrating an example of a procedure of switching a connection path between the ASSP and the storage device according to the first exemplary embodiment.

Next, a procedure of switching the connection path between the ASSP 422 and the storage device 421 is described. FIG. 7 is a flowchart illustrating an example of the procedure of switching the connection path between the ASSP 422 and the storage device 421 according to the first exemplary embodiment. For example, the procedure illustrated in FIG. 7 is executed when the image forming apparatus 1 is activated. More specifically, the procedure is executed when power is supplied to the image forming apparatus 1 or when the image forming apparatus 1 recovers from a sleep mode.

First, the machine information acquiring part 501 acquires the machine information stored in the storage part (not illustrated) (Step 101). Next, the connection establishing part 504 sets a count to "0" (Step 102). The count indicates the number of times the connection establishing part 504 has executed the processing of establishing connection. At this time, "0" is set because the number of times is zero.

Next, the machine information determining part 502 determines whether the machine information is "Storage-less" (Step 103). If the result of determination in Step 103 is "Yes", the connection establishing part 504 recognizes that the storage device 421 is not present (Step 104). In this case, the image forming apparatus 1 operates as the storage-less configuration. Then, the processing flow is terminated.

If the result of determination in Step 103 is "No", the connection establishing part 504 determines whether the count is "2" (Step 105). That is, the connection establishing part 504 determines whether the processing of establishing connection has been executed twice. If the processing of establishing connection has not been executed yet, the result of determination is "No" because the count is "0". As described later, if the connection is not established as a result of any one of the processing of establishing connection by SATA or the processing of establishing connection by PCIe, the result of determination is "No" because the count is "1". If the connection is not established as a result of either the processing of establishing connection by SATA or the processing of establishing connection by PCIe, the result of determination is "Yes" because the count is "2".

If the result of determination in Step 105 is "Yes", the connection is not established either by SATA or by PCIe. In this case, the connection establishing part 504 sets "Storage-less" as the machine information stored in the storage part (Step 106). Then, the processing flow proceeds to Step 104.

If the result of determination in Step 105 is "No", the machine information determining part 502 determines whether the machine information is "SATA" (Step 107). If the result of determination in Step 107 is "Yes", the switching signal transmitting part 503 transmits the SATA switching signal to the SERDES switch 424 (Step 108). Next, the connection establishing part 504 initializes the SATA controller 429A (Step 109). After Step 109, the processing flow proceeds to Step 112 described later.

If the result of determination in Step 107 is "No", that is, if it is determined that the machine information is neither "SATA" nor "Storage-less", the machine information is "PCIe" or "Unset" and the switching signal transmitting part 503 transmits the PCIe switching signal to the SERDES switch 424 (Step 110). Next, the connection establishing part 504 initializes the PCIe controller 430A (Step 111). After Step 111, the processing flow proceeds to Step 112 described later.

After Step 109 or Step 111, the connection establishing part 504 determines whether the connection between the ASSP 422 and the storage device 421 has been established (Step 112).

If the result of determination in Step 112 is "No", the connection establishing part 504 sets "SATA" or "PCIe" as the machine information (Step 113).

More specifically, if it is determined in Step 112 that the connection has not been established as a result of the processing of Steps 108 and 109, that is, as a result of the processing of establishing connection by SATA, the connection establishing part 504 sets "PCIe" as the machine information in Step 113. If it is determined in Step 112 that the connection has not been established as a result of the processing of Steps 110 and 111, that is, as a result of the processing of establishing connection by PCIe, the connection establishing part 504 sets "SATA" as the machine information in Step 113.

Next, the connection establishing part 504 increments the count by "1" (Step 114). Then, the processing flow proceeds to Step 105.

If the result of determination in Step 112 is "Yes", the connection establishing part 504 sets the connection standard by which the connection has been established as the machine information (Step 115).

More specifically, if it is determined in Step 112 that the connection has been established as a result of the processing of Steps 108 and 109, that is, as a result of the processing of establishing connection by SATA, the connection establishing part 504 sets "SATA" as the machine information in Step 115. If it is determined in Step 112 that the connection has been established as a result of the processing of Steps 110 and 111, that is, as a result of the processing of establishing connection by PCIe, the connection establishing part 504 sets "PCIe" as the machine information in Step 115.

Next, processing of initializing the storage device 421 is executed in such a manner that the connection establishing part 504 gives an initialization instruction to the storage device 421 (Step 116). Then, the processing flow is terminated.

Thus, data is exchanged between the ASSP 422 and the storage device 421 by SATA if the connection has been established by the processing of Steps 108 and 109, or by PCIe if the connection has been established by the processing of Steps 110 and 111.

In Step 115, the connection standard by which the connection has been established is set as the machine information. In the second or subsequent processing, the previous connection standard by which the connection has been established is set as the machine information acquired by the machine information acquiring part 501. For example, once the connection has been established by SATA, the second or subsequent connection is established by SATA without the processing of establishing connection by PCIe (processing of Steps 110 and 111 of FIG. 7). For example, once the connection has been established by PCIe, the second or subsequent connection is established by PCIe without the processing of establishing connection by SATA (processing of Steps 108 and 109 of FIG. 7).

For example, if the storage device 421 is compliant with PCIe but not with SATA, connection is not established even by the processing of establishing connection by SATA. When the processing of establishing connection by SATA is executed, the processing is executed until timeout. When a predetermined time has elapsed, the processing is terminated due to timeout. By setting "PCIe" as the machine information, the processing of establishing connection by SATA is not executed in the second or subsequent processing, thereby eliminating the need to wait until timeout.

In the example described above, the machine information determining part 502 determines in Step 107 whether the machine information is "SATA" but may determine whether the machine information is "PCIe". If the machine information has not been set yet, the processing of transmitting the SATA switching signal (Step 108) is executed.

<Data Transfer Control Depending on Interface>

Next, description is made of a case of controlling data transfer inside the image forming apparatus 1 depending on the interface through which the connection to the storage device 421 has been established.

In this exemplary embodiment, the image forming apparatus 1 may control data transfer inside the image forming apparatus 1 depending on the interface through which the connection to the storage device 421 has been established. More specifically, the image forming apparatus 1 may control data transfer between the ASSP 422 and the storage device 421 depending on the interface through which the connection to the storage device 421 has been established.

Figure 8:
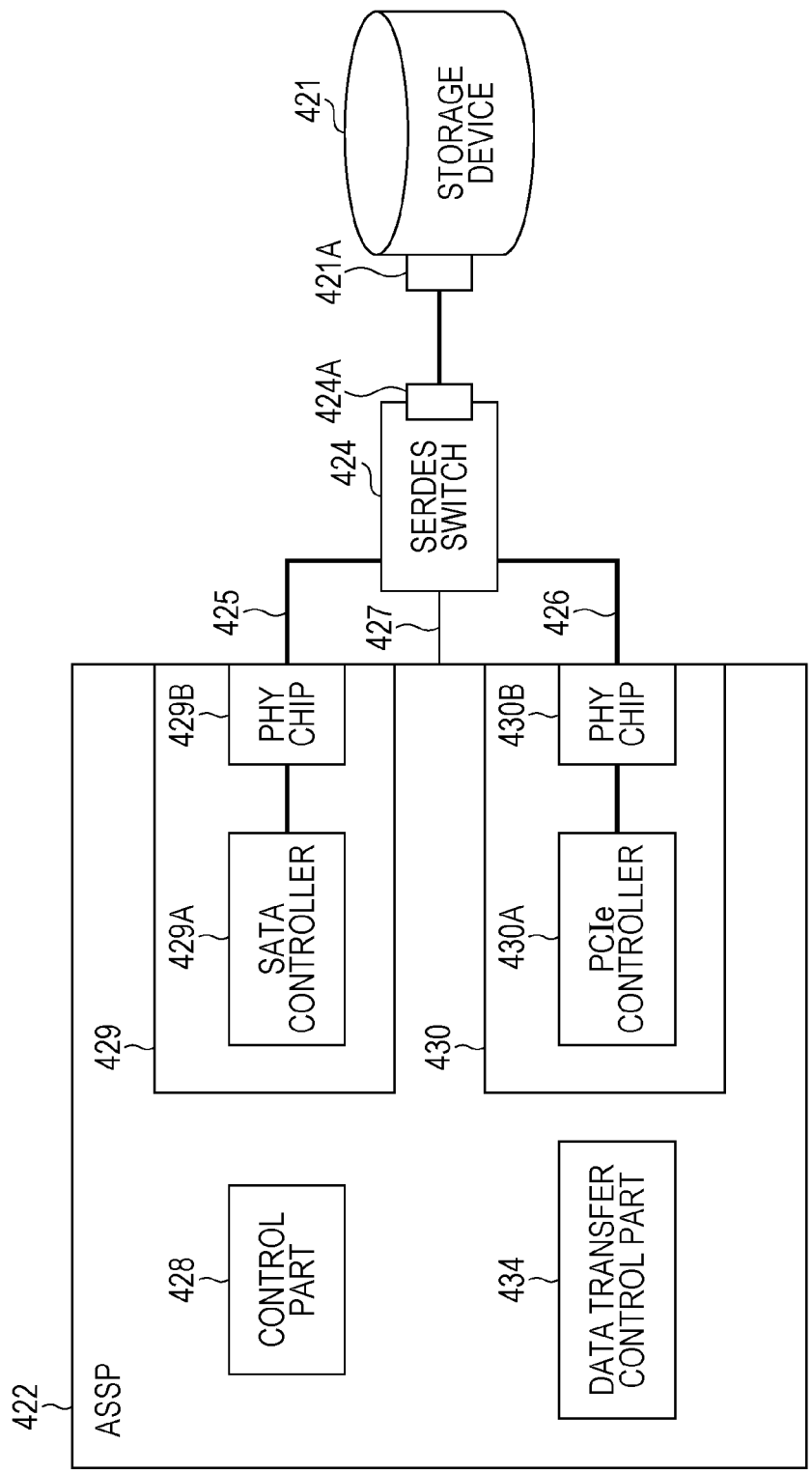
FIG. 8 illustrates an example of the configuration of the ASSP including a data transfer control part.

In this case, for example, the ASSP 422 is provided with a data transfer control part 434. FIG. 8 illustrates an example of the configuration of the ASSP 422 including the data transfer control part 434. In this exemplary embodiment, the data transfer control part 434 is used as an example of a data transfer controller. The data transfer control part 434 is not limited to the configuration in which the data transfer control part 434 is provided in the ASSP 422 as illustrated in FIG. 8 but may be provided at a different portion inside the image forming apparatus 1.

For example, the data transfer control part 434 controls a data transfer timing or a data transfer rate depending on the interface through which the connection to the storage device 421 has been established.

First, description is made of the case of controlling the data transfer timing.

For example, when the copying function is executed, as illustrated in FIG. 4, image data generated by the image reading part 110 is temporarily stored in the storage device 421 and sequentially transferred from the storage device 421 to the page memory 423 and then to the image forming part 210. Then, an image is formed by the image forming part 210. Therefore, if the image data to be transferred to the image forming part 210 is interrupted at some midpoint, the paper P output from the image forming part 210 is left blank. In general, a predetermined amount of image data is accumulated in the storage device 421 and then sequentially output from the storage device 421 to the page memory 423. Then, an image is formed by the image forming part 210.

PCIe has a higher transfer rate than SATA and may simultaneously execute bidirectional communications by full-duplex communication. Specifically, SATA and PCIe differ in terms of the transfer rate depending on generations in use. For example, the physical transfer rate of SATA Revision 1.0 is 1.5 Gbps, the physical transfer rate of SATA Revision 2.0 is 3 Gbps, and the physical transfer rate of SATA Revision 3.0 is 6 Gbps. The physical transfer rate of PCIe for each link width is 2.5 Gbps in each direction in a case of PCIe (GEN 1), 5 Gbps in each direction in a case of PCIe (GEN 2), 8 Gbps in each direction in a case of PCIe (GEN 3), and 16 Gbps in each direction in a case of PCIe (GEN 4). In general, PCIe has a higher transfer rate than SATA. Thus, if the ASSP 422 and the storage device 421 are connected to each other by PCIe, compared with the case of connection by SATA, an image may be formed without causing a situation in which the image data to be transferred to the image forming part 210 is interrupted at some midpoint even if image data transfer from the storage device 421 to the page memory 423 is controlled to start earlier.

For example, in the case of connection by SATA, image data for one page is accumulated in the storage device 421 and then sequentially transferred from the storage device 421 to the page memory 423. For example, in the case of connection by PCIe, the transfer of image data from the system memory 413 to the storage device 421 and the transfer of image data from the storage device 421 to the page memory 423 may be executed simultaneously and the transfer rate is higher than in the case of connection by SATA. Therefore, even if the transfer from the storage device 421 to the page memory 423 is started at, for example, a timing when image data for a ⅔ page is accumulated in the storage device 421, the image data is transferred to the image forming part 210 without being interrupted at some midpoint.

In the case of connection by PCIe, the data transfer control part 434 controls the transfer from the storage device 421 to the page memory 423 to start earlier than in the case of connection by SATA. In other words, in the case of connection by PCIe, the data transfer control part 434 controls an output instruction to be given to the image forming part 210 earlier than in the case of connection by SATA. As a result, in the case of connection by PCIe, the time required to output the first paper P after the start of the copying function is shortened compared with the case of connection by SATA. The timings to start the transfer of image data for the first paper P and image data for the second or subsequent paper P are similar to each other. Therefore, the time required to output each paper P is shortened and the overall copying time is shortened.

Similarly, for example, when the printing function is executed, image data to be printed is temporarily stored in the storage device 421 and sequentially transferred from the storage device 421 to the page memory 423. In the case of connection by PCIe, the data transfer control part 434 controls the transfer from the storage device 421 to the page memory 423 to start earlier than in the case of connection by SATA.

For example, in the printing function, the storage device 421 is used as a memory for temporary accumulation in band processing to be executed by the image processing part 414. The band processing is executed for image data in units of a band. The band is a unit of one or more lines (for example, one line or two lines) of image data in one direction (for example, a main scanning direction). In the case of connection by PCIe, the transfer rate is higher than in the case of connection by SATA. Accordingly, the unit (band) of the band processing is increased to transfer image data collectively, thereby reducing the number of transfer operations as a whole. Thus, transfer overhead (for example, preprocessing related to transfer) is reduced and the overall printing time is shortened.

Next, description is made of the case of controlling the data transfer rate.

For example, the data transfer control part 434 controls the rate of data transfer between the ASSP 422 and the storage device 421 depending on the interface through which the connection to the storage device 421 has been established. Since PCIe has a higher transfer rate than SATA, the other processing is not handled sufficiently in the case of connection by PCIe. Therefore, it is conceivable that the load on the CPU 411 increases to hinder the operation of the CPU 411. If the ASSP 422 and the storage device 421 are connected to each other by PCIe, the data transfer control part 434 executes control, for example, so that the rate of data transfer between the ASSP 422 and the storage device 421 is equal to or lower than a predetermined upper limit value.

The data transfer control part 434 is not limited to the data transfer between the ASSP 422 and the storage device 421 but may control data transfer through other interfaces.

More specifically, for real-time processing such as the image formation to be executed by the image forming part 210 or processing that requires reception confirmation by an acknowledgement (ACK), the data transfer control part 434 controls the transfer rate or the transfer timing of a corresponding interface so that image data is transferred with a high priority level. For non-real-time processing such as the band processing, the data transfer control part 434 controls the transfer rate or the transfer timing of a corresponding interface while giving a lower priority level than in the case of real-time processing. Thus, the data transfer control part 434 may adjust the transfer rate and the transfer timing of image data in each interface by executing priority control, in other words, an arbitration function for the data transfer to be executed inside the image forming apparatus 1.

<Description of Case of Operation as Storage-Less Configuration>

Next, description is made of processing to be executed when the image forming apparatus 1 operates as the storage-less configuration. As described above, the image forming apparatus 1 operates as the storage-less configuration if it is recognized that the storage device 421 is not present.

If the image forming apparatus 1 operates as the storage-less configuration, the image forming apparatus 1 determines whether a different memory such as an SD memory card is inserted into the image forming apparatus 1. For example, if the SD memory card is inserted, the copying function, the scanning function, the facsimile transmission and reception function, or the printing function is executed by storing image data in the SD memory card. For example, if the SD memory card is not inserted, an error occurs in the facsimile transmission and reception function or other functions that require a storage area that stores image data.

In general, the memory such as the SD memory card that is easily removable has a smaller storage capacity than an HDD, an SSD, or the like. Therefore, if the memory such as the SD memory card is used, the amount of image data that may be stored in the image forming apparatus 1 decreases and the functions are partially limited compared with the case in which the storage device 421 is used.

For example, in a case of executing an electronic sorting function for outputting a plurality of copies one by one by storing image data corresponding to all pages included in one copy, the number of sheets of paper P that may be subjected to electronic sorting is limited if the SD memory card is used compared with the case in which the storage device 421 is used.

If the SD memory card is used in the case of executing the printing function, for example, the paper P is output from the image forming apparatus 1 while image data is not stored (spooled). For example, if image data to be printed is transmitted from a personal computer (PC) to the image forming apparatus 1, subsequent image data is transmitted from the PC to the image forming apparatus 1 after the image forming apparatus 1 has finished processing of printing image data for the first paper.

If the memory such as the SD memory card is used, installable software is limited compared with the case in which the storage device 421 is used. For example, software that exceeds a free space of the SD memory card is not installable.

The storage destination of a telephone book in which destinations of image data transmission are registered or a destination list in which mail destinations are registered is changed from the storage device 421 to the SD memory card.

If the storage device such as an HDD or an SSD is not mounted on the PC, the PC is unable to execute its processing. Therefore, if it is recognized that the storage device is not present in the PC at the time of activation of the PC, the processing is generally terminated due to an error. Even if it is recognized that the storage device 421 is not present, the image forming apparatus 1 according to this exemplary embodiment operates as the storage-less configuration and executes processing while the functions are partially limited.

As described above, in the image forming apparatus 1 according to this exemplary embodiment, the ASSP 422 is compliant both with SATA and with PCIe and the connection between the ASSP 422 and the storage device 421 is established by switching the connection standard to SATA or PCIe by the SERDES switch 424 based on the machine information.

After the connection has been established by SATA or PCIe, the image forming apparatus 1 according to this exemplary embodiment executes various image processing functions by adjusting, for example, the timing or the rate of image data transfer from the storage device 421 or the unit of processing of the image data in accordance with the standard by which the connection has been established.

If the SD memory card or the like is used in the case in which the image forming apparatus 1 operates as the storage-less configuration, the processing is executed while the functions are partially limited compared with the case in which the storage device 421 is used.

In the example described above, the SERDES switch 424 is provided outside the ASSP 422 but may be provided inside the ASSP 422.

<Other Example of Control Part of ASSP>

Next, another example of the functional configuration of the control part 428 of the ASSP 422 is described. In the example described above, the connection path or the like is switched based on the machine information. In this example, the connection path or the like is switched without using the machine information. More specifically, the connection path or the like is switched based on a signal transmitted from the storage device 421.

More specifically, negotiation called an Out of Band (OOB) sequence is executed in SATA before data transfer. In the OOB sequence, an OOB signal is exchanged to execute initialization, transfer rate negotiation, or the like. In this example, the connection path or the like is switched based on the OOB signal transmitted from the storage device 421, in other words, based on whether the OOB signal from the storage device 421 has been detected. In this exemplary embodiment, the OOB signal is used as an example of a predetermined signal.

Figure 9:
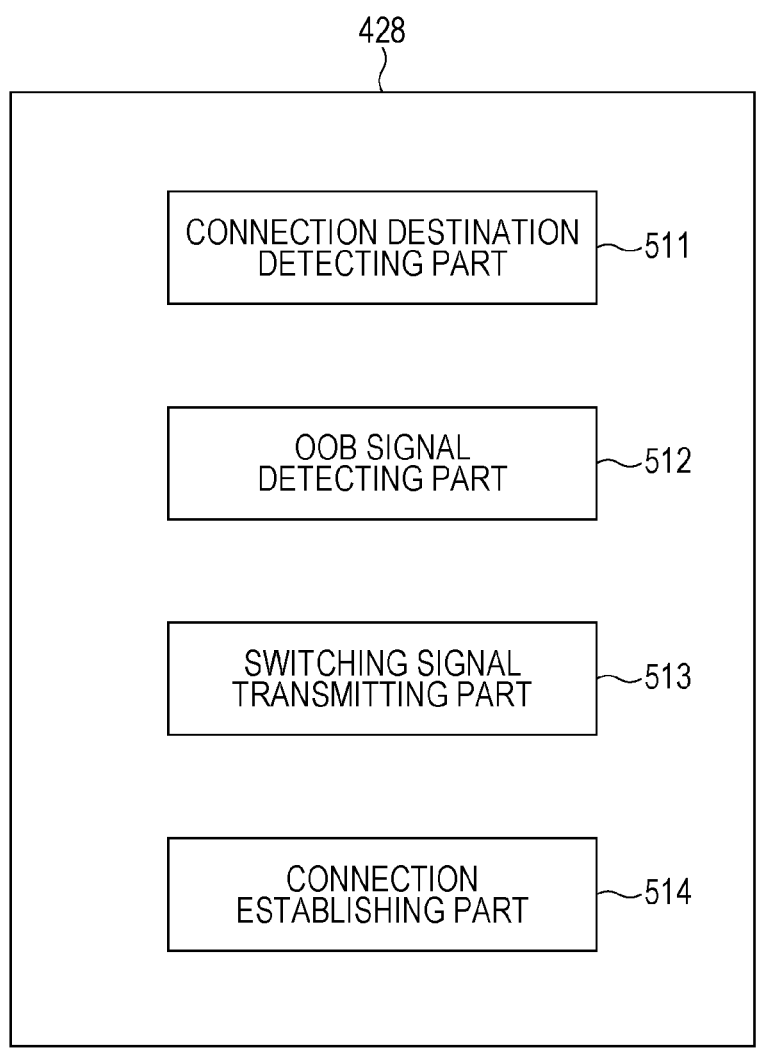
FIG. 9 is a block diagram illustrating an example of the functional configuration of the control part of the ASSP according to another example of the first exemplary embodiment.

FIG. 9 is a block diagram illustrating an example of the functional configuration of the control part 428 of the ASSP 422 according to the other example of the first exemplary embodiment. The control part 428 includes a connection destination detecting part 511, an OOB signal detecting part 512, a switching signal transmitting part 513, and a connection establishing part 514. In an initial state, it is assumed that the SERDES switch 424 has switched the connection path to the SATA side.

For example, the connection destination detecting part 511 detects a load of a connection destination (that is, the storage device 421) connected to the ASSP 422 when the image forming apparatus 1 is activated. More specifically, the connection destination detecting part 511 detects a state of a current (for example, a timing of a flow of the current) flowing through the PHY chip 429B on the side set by the switching of the SERDES switch 424 (that is, the SATA side). Based on the detected state of the current, the connection destination detecting part 511 determines whether the current flows when the load is not present or when the load is present.

The OOB signal detecting part 512 detects the OOB signal transmitted from the storage device 421 to the ASSP 422. More specifically, the OOB signal detecting part 512 determines whether the PHY chip 429B has received the OOB signal.

Based on whether the OOB signal detecting part 512 has detected the OOB signal, the switching signal transmitting part 513 transmits, to the SERDES switch 424 via the bus 427, a switching signal for an instruction to switch the connection path.

More specifically, if the OOB signal detecting part 512 has detected the OOB signal, the switching signal transmitting part 513 keeps the connection path on the SATA side without transmitting the switching signal to the SERDES switch 424. If the OOB signal detecting part 512 has not detected the OOB signal, the switching signal transmitting part 513 transmits the PCIe switching signal to the SERDES switch 424 via the bus 427.

Based on whether the OOB signal detecting part 512 has detected the OOB signal, the connection establishing part 514 executes processing of establishing connection between the ASSP 422 and the storage device 421. The processing to be executed by the connection establishing part 514 differs depending on the case in which the OOB signal detecting part 512 has detected the OOB signal and the case in which the OOB signal detecting part 512 has not detected the OOB signal.

If the OOB signal detecting part 512 has detected the OOB signal, the connection establishing part 514 initializes the SATA controller 429A and the PHY chip 429B. Then, the connection establishing part 514 determines whether the connection between the ASSP 422 and the storage device 421 has been established. If the connection establishing part 514 determines that the connection has been established, the storage device 421 is initialized, for example. If the connection establishing part 514 determines that the connection has not been established, the image forming apparatus 1 operates as the storage-less configuration.

If the OOB signal detecting part 512 has not detected the OOB signal, the connection establishing part 514 initializes the PCIe controller 430A and the PHY chip 430B. Then, the connection establishing part 514 determines whether the connection between the ASSP 422 and the storage device 421 has been established. If the connection establishing part 514 determines that the connection has been established, the storage device 421 is initialized, for example. If the connection establishing part 514 determines that the connection has not been established, the image forming apparatus 1 operates as the storage-less configuration.

Figure 10:
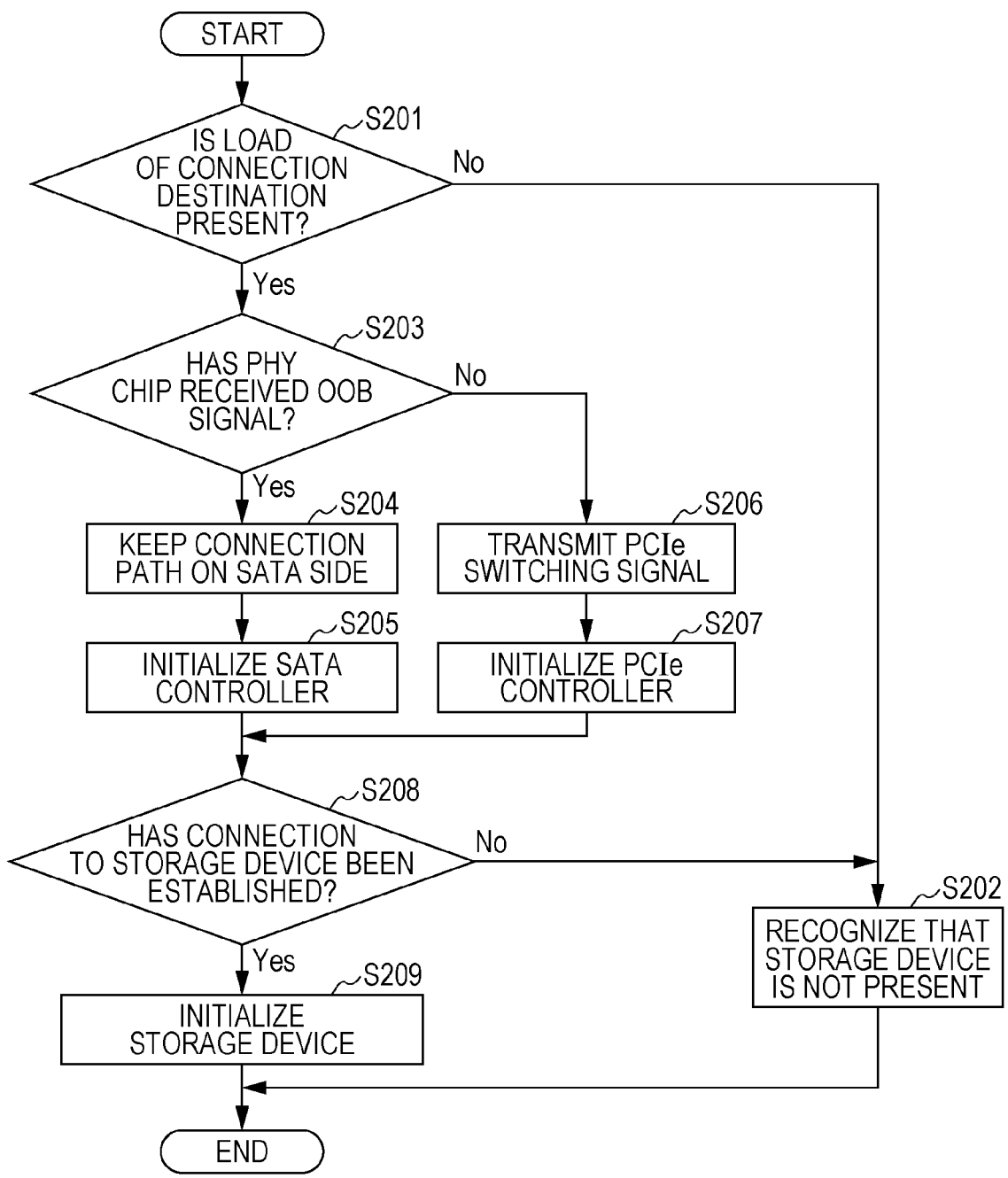
FIG. 10 is a flowchart illustrating an example of a procedure of switching the connection path between the ASSP and the storage device according to the other example of the first exemplary embodiment.

FIG. 10 is a flowchart illustrating an example of a procedure of switching the connection path between the ASSP 422 and the storage device 421 according to the other example of the first exemplary embodiment. For example, the procedure illustrated in FIG. 10 is executed when the image forming apparatus 1 is activated similarly to the procedure illustrated in FIG. 7.

First, the connection destination detecting part 511 determines whether the load of the connection destination is present (Step 201). If the result of determination in Step 201 is "No", the connection establishing part 514 recognizes that the storage device 421 is not present (Step 202). In this case, the image forming apparatus 1 operates as the storage-less configuration. Then, the processing flow is terminated.

If the result of determination in Step 201 is "Yes", the OOB signal detecting part 512 determines whether the PHY chip 429B has received the OOB signal (Step 203).

If the result of determination in Step 203 is "Yes", the switching signal transmitting part 513 keeps the connection path on the SATA side in the SERDES switch 424 without transmitting the switching signal (Step 204). Next, the connection establishing part 514 initializes the SATA controller 429A (Step 205). After Step 205, the processing flow proceeds to Step 208 described later.

If the result of determination in Step 203 is "No", the switching signal transmitting part 513 transmits the PCIe switching signal to the SERDES switch 424 (Step 206). Next, the connection establishing part 514 initializes the PCIe controller 430A (Step 207). After Step 207, the processing flow proceeds to Step 208 described later.

After Step 205 or Step 207, the connection establishing part 514 determines whether the connection between the ASSP 422 and the storage device 421 has been established (Step 208).

If the result of determination in Step 208 is "No", the processing flow proceeds to Step 202.

If the result of determination in Step 208 is "Yes", processing of initializing the storage device 421 is executed in such a manner that the connection establishing part 514 gives an initialization instruction to the storage device 421 (Step 209). Then, the processing flow is terminated.

In this example, the connection between the ASSP 422 and the storage device 421 is established by switching the standard between SATA and PCIe based on the OOB signal as described above.

In this example, if the connection has been established based on the OOB signal, the connection standard in this case may be set in, for example, a non-volatile storage part (not illustrated) provided inside or outside the ASSP 422. With this configuration, the second or subsequent connection is established based on the connection standard set in the storage part. Once the connection has been established by SATA, connection is established by SATA without the processing of establishing connection by PCIe. Once the connection has been established by PCIe, connection is established by PCIe without the processing of establishing connection by SATA.

In the example described above, the OOB signal detecting part 512 of the control part 428 determines whether the PHY chip 429B has received the OOB signal but the PHY chip 429B may make this determination. Specifically, the PHY chip 429B may execute the processing of Step 203 of FIG. 10.

Second Exemplary Embodiment

Next, a second exemplary embodiment is described. The first exemplary embodiment and the second exemplary embodiment differ in terms of the connection relationship between the ASSP 422 and the storage device 421.

Specifically, in the first exemplary embodiment, the SERDES switch 424 is provided and switches the connection path or the like.

In the second exemplary embodiment, the SERDES switch 424 is not provided but a SERDES-PHY 431 is newly provided in the circuit board of the ASSP 422.

The image forming apparatus 1 according to the second exemplary embodiment is similar to the image forming apparatus 1 according to the first exemplary embodiment in terms of the configuration except the connection relationship between the ASSP 422 and the storage device 421.

In this exemplary embodiment, the ASSP 422 is used as an example of the electronic device. If the storage device 421 is provided outside the control device 400, the control device 400 may be regarded as an example of the electronic device similarly to the first exemplary embodiment.

<Connection Relationship Between ASSP and Storage Device>

Figure 11:
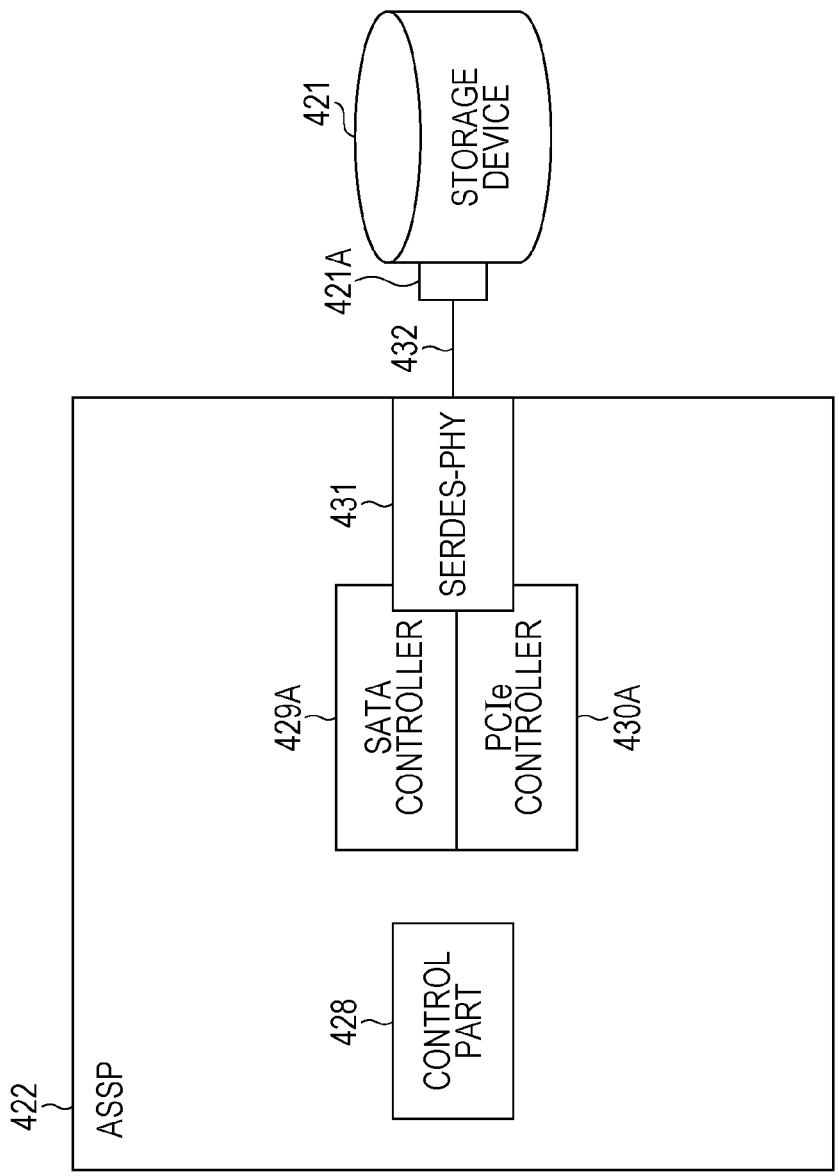
FIG. 11 illustrates an example of a connection relationship between the ASSP and the storage device according to a second exemplary embodiment.

Next, the connection relationship between the ASSP 422 and the storage device 421 is described. FIG. 11 illustrates an example of the connection relationship between the ASSP 422 and the storage device 421 according to the second exemplary embodiment.

The ASSP 422 includes the SERDES-PHY 431, the control part 428, the SATA controller 429A, and the PCIe controller 430A.

The SERDES-PHY 431 is connected to the storage device 421 via a bus 432. The SERDES-PHY 431 is connected to the SATA controller 429A and the PCIe controller 430A inside the ASSP 422. The SATA parameter or the PCIe parameter is set in the SERDES-PHY 431 depending on the connection standard.

More specifically, the SATA parameter is set in the SERDES-PHY 431 if the ASSP 422 and the storage device 421 are connected to each other by SATA. The PCIe parameter is set in the SERDES-PHY 431 if the ASSP 422 and the storage device 421 are connected to each other by PCIe. The SATA parameter and the PCIe parameter are stored in advance in, for example, a non-volatile storage part (not illustrated) provided inside or outside the ASSP 422. The SERDES-PHY 431 acquires the SATA parameter or the PCIe parameter from the storage part. In this exemplary embodiment, the SERDES-PHY 431 is used as an example of the switching unit.

The SATA controller 429A and the PCIe controller 430A are similar to those of the first exemplary embodiment and therefore description thereof is omitted. The control part 428 is similar to that of the first exemplary embodiment in that the overall operation of the ASSP 422 is controlled. The functional configuration of the control part 428 differs from that of the first exemplary embodiment. The functional configuration of the control part 428 is described later. In the example illustrated in FIG. 11, the data transfer control part 434 is not illustrated. The data transfer control part 434 is provided in the case of controlling data transfer depending on the interface through which the connection to the storage device 421 has been established.

<Functional Configuration of Control Part of ASSP>

Figure 12:
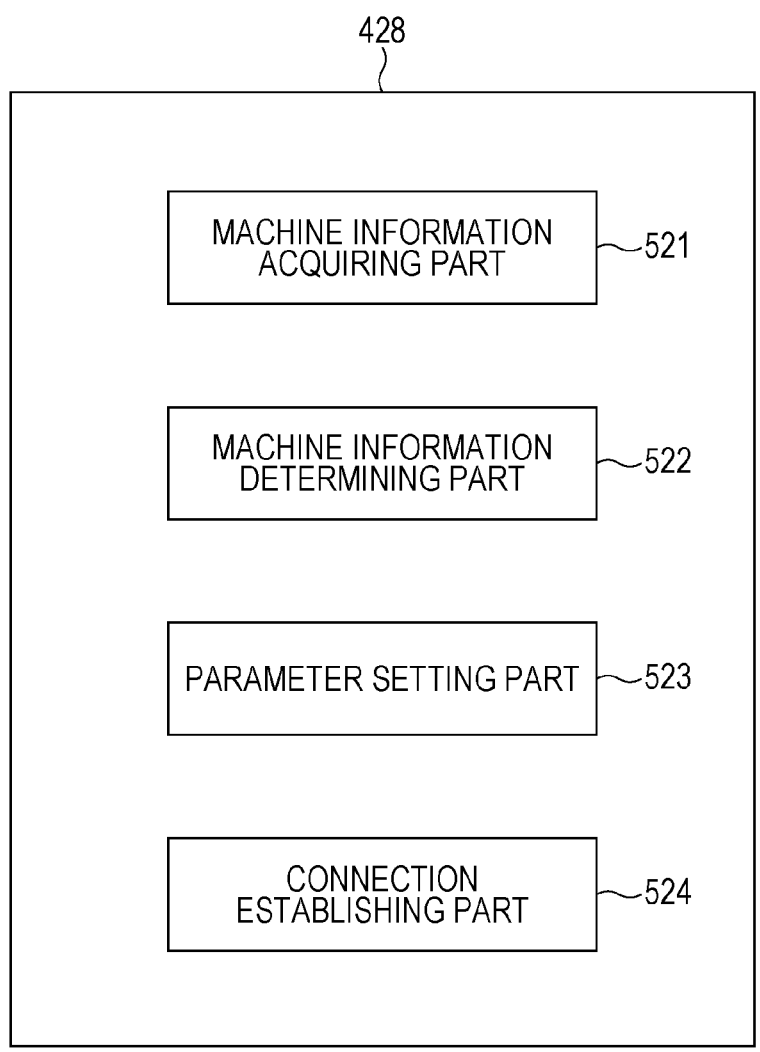
FIG. 12 is a block diagram illustrating an example of the functional configuration of the control part of the ASSP according to the second exemplary embodiment.

Next, the functional configuration of the control part 428 of the ASSP 422 is described. FIG. 12 is a block diagram illustrating an example of the functional configuration of the control part 428 of the ASSP 422 according to the second exemplary embodiment. The control part 428 includes a machine information acquiring part 521, a machine information determining part 522, a parameter setting part 523, and a connection establishing part 524.

Each of the machine information acquiring part 521, the machine information determining part 522, and the connection establishing part 524 executes processing similar to that of the first exemplary embodiment and therefore description thereof is omitted.

Based on determination made by the machine information determining part 522, the parameter setting part 523 instructs the SERDES-PHY 431 to acquire the SATA parameter or the PCIe parameter. Then, the parameter setting part 523 sets the acquired parameter in the SERDES-PHY 431.

More specifically, if the machine information determining part 522 determines that the machine information is "SATA", the parameter setting part 523 instructs the SERDES-PHY 431 to acquire the SATA parameter from the storage part (not illustrated). Then, the parameter setting part 523 sets the acquired SATA parameter in the SERDES-PHY 431.

If the machine information determining part 522 determines that the machine information is "PCIe", in other words, if the machine information determining part 522 determines that the machine information is neither "SATA" nor "Storage-less", the parameter setting part 523 instructs the SERDES-PHY 431 to acquire the PCIe parameter from the storage part (not illustrated). Then, the parameter setting part 523 sets the acquired PCIe parameter in the SERDES-PHY 431.

If the machine information determining part 522 determines that the machine information has not been set yet, the parameter setting part 523 instructs the SERDES-PHY 431 to acquire the SATA parameter or the PCIe parameter that is determined in advance.

The parameter setting part 523 may acquire a parameter from the storage part (not illustrated) and set the acquired parameter in the SERDES-PHY 431 instead of the configuration in which the parameter setting part 523 instructs the SERDES-PHY 431 to acquire various parameters. In this case, the parameter setting part 523 may be regarded as an example of the switching unit.

<Procedure of Switching Parameter>

Figure 13:
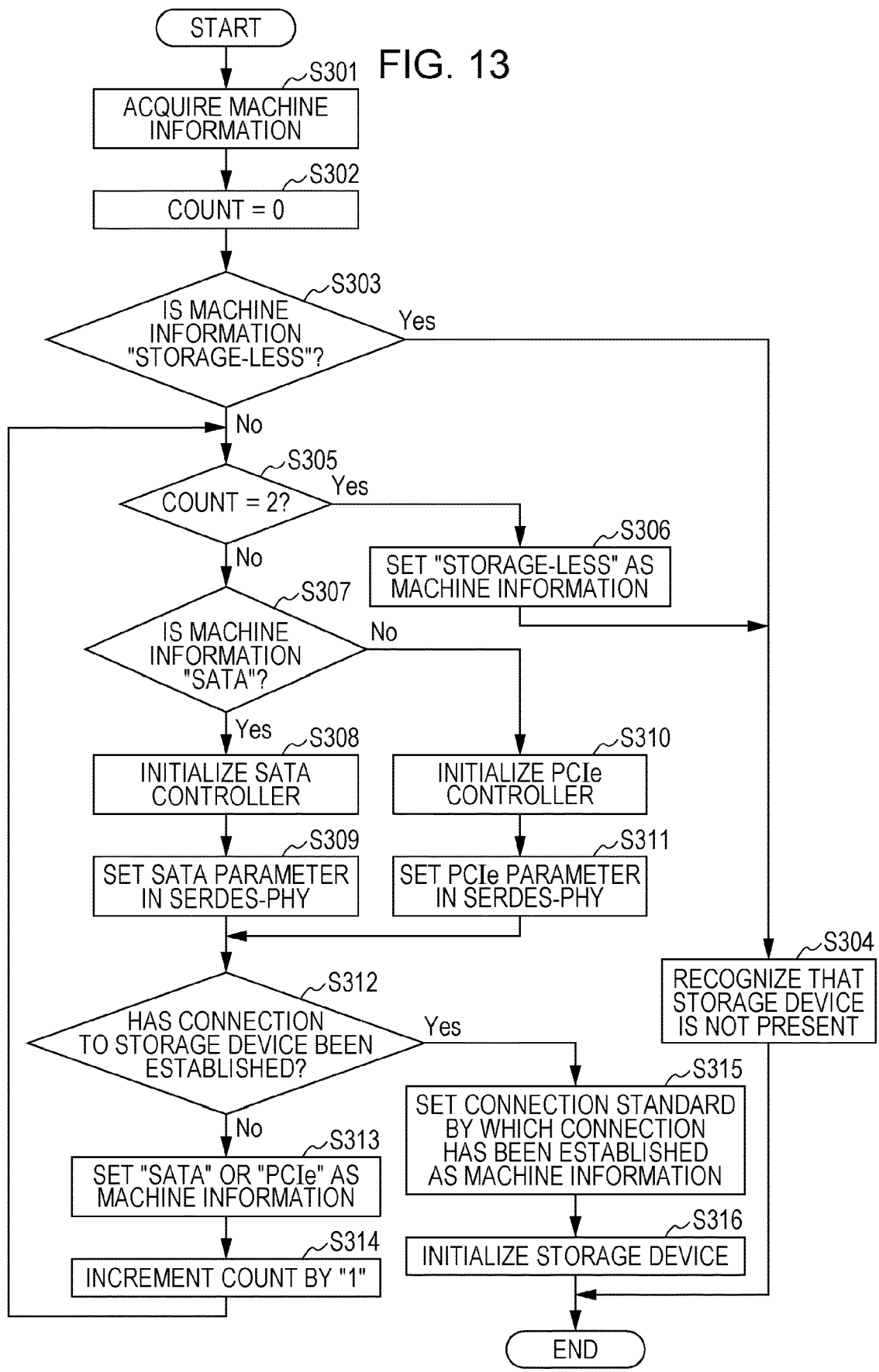
FIG. 13 is a flowchart illustrating an example of a procedure of switching a parameter to be used for connection between the ASSP and the storage device according to the second exemplary embodiment.

Next, a procedure of switching the parameter to be used for the connection between the ASSP 422 and the storage device 421 is described. FIG. 13 is a flowchart illustrating an example of the procedure of switching the parameter to be used for the connection between the ASSP 422 and the storage device 421 according to the second exemplary embodiment.

First, processing of Step 301 to Step 307 is similar to the processing of Step 101 to Step 107 of FIG. 7 and therefore description thereof is omitted.

If the result of determination in Step 307 is "Yes", that is, if it is determined that the machine information is "SATA", the connection establishing part 524 initializes the SATA controller 429A (Step 308). Next, the parameter setting part 523 instructs the SERDES-PHY 431 to acquire the SATA parameter from the storage part (not illustrated). Then, the parameter setting part 523 sets the acquired SATA parameter in the SERDES-PHY 431 (Step 309). After Step 309, the processing flow proceeds to Step 312 described later.

If the result of determination in Step 307 is "No", that is, if it is determined that the machine information is neither "SATA" nor "Storage-less", the machine information is "PCIe" or "Unset" and the connection establishing part 524 initializes the PCIe controller 430A (Step 310). Next, the parameter setting part 523 instructs the SERDES-PHY 431 to acquire the PCIe parameter from the storage part (not illustrated). Then, the parameter setting part 523 sets the acquired PCIe parameter in the SERDES-PHY 431 (Step 311). After Step 311, the processing flow proceeds to Step 312 described later.

After Step 309 or Step 311, the connection establishing part 524 determines whether the connection between the ASSP 422 and the storage device 421 has been established (Step 312). Processing of Step 312 to Step 316 is similar to the processing of Step 112 to Step 116 of FIG. 7 and therefore description thereof is omitted.

Thus, data is exchanged between the ASSP 422 and the storage device 421 by SATA if the connection has been established by the processing of Steps 308 and 309, or by PCIe if the connection has been established by the processing of Steps 310 and 311.

In the example described above, the machine information determining part 522 determines in Step 307 whether the machine information is "SATA" but may determine whether the machine information is "PCIe". If the machine information has not been set yet, the processing of initializing the SATA controller (Step 308) is executed.

As described above, in the image forming apparatus 1 according to this exemplary embodiment, the connection between the ASSP 422 and the storage device 421 is established by setting the SATA parameter or the PCIe parameter in the SERDES-PHY 431. In the second exemplary embodiment, SATA and PCIe are switched therebetween without providing the SERDES switch 424, the SATA bus 425, and the PCIe bus 426 unlike the first exemplary embodiment.

Similarly to the first exemplary embodiment, after the connection has been established by SATA or PCIe, the image forming apparatus 1 according to this exemplary embodiment adjusts, for example, the timing or the rate of image data transfer from the storage device 421 or the unit of processing of the image data in accordance with the standard by which the connection has been established. If the SD memory card or the like is used in the case in which the image forming apparatus 1 operates as the storage-less configuration, the functions are partially limited.

<Other Example of Control Part of ASSP>

Next, another example of the functional configuration of the control part 428 of the ASSP 422 is described. In the example described above, the connection path or the like is switched based on the machine information. In this example, the connection path or the like is switched based on a signal transmitted from the storage device 421 without using the machine information similarly to the other example of the first exemplary embodiment.

Figure 14:
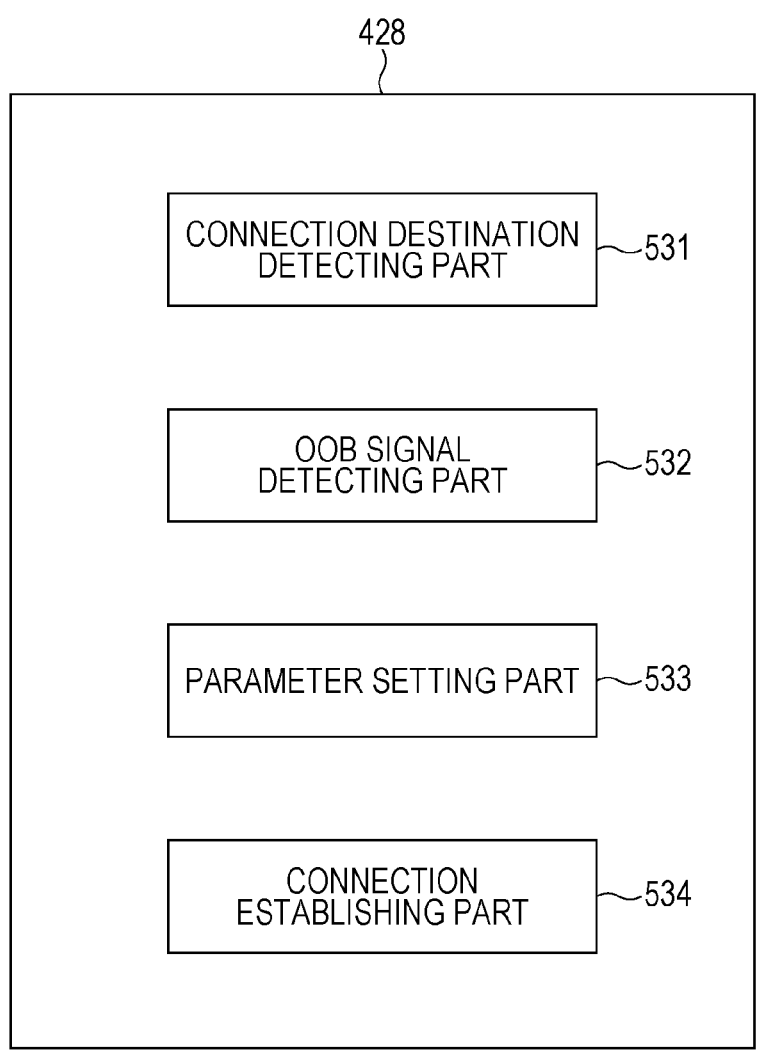
FIG. 14 is a block diagram illustrating an example of the functional configuration of the control part of the ASSP according to another example of the second exemplary embodiment.

FIG. 14 is a block diagram illustrating an example of the functional configuration of the control part 428 of the ASSP 422 according to the other example of the second exemplary embodiment. The control part 428 includes a connection destination detecting part 531, an OOB signal detecting part 532, a parameter setting part 533, and a connection establishing part 534.

Each of the connection destination detecting part 531 and the connection establishing part 534 executes processing similar to that of the other example of the first exemplary embodiment and therefore description thereof is omitted.

The OOB signal detecting part 532 detects the OOB signal transmitted from the storage device 421 to the ASSP 422. More specifically, the OOB signal detecting part 532 determines whether the SERDES-PHY 431 has received the OOB signal.

Based on whether the OOB signal detecting part 532 has detected the GOB signal, the parameter setting part 533 instructs the SERDES-PHY 431 to acquire the SATA parameter or the PCIe parameter. Then, the parameter setting part 533 sets the acquired parameter in the SERDES-PHY 431.

More specifically, if the GOB signal detecting part 532 has detected the GOB signal, the parameter setting part 533 instructs the SERDES-PHY 431 to acquire the SATA parameter from the storage part (not illustrated). Then, the parameter setting part 533 sets the acquired SATA parameter in the SERDES-PHY 431. If the OOB signal detecting part 532 has not detected the OOB signal, the parameter setting part 533 instructs the SERDES-PHY 431 to acquire the PCIe parameter from the storage part (not illustrated). Then, the parameter setting part 533 sets the acquired PCIe parameter in the SERDES-PHY 431.

Figure 15:
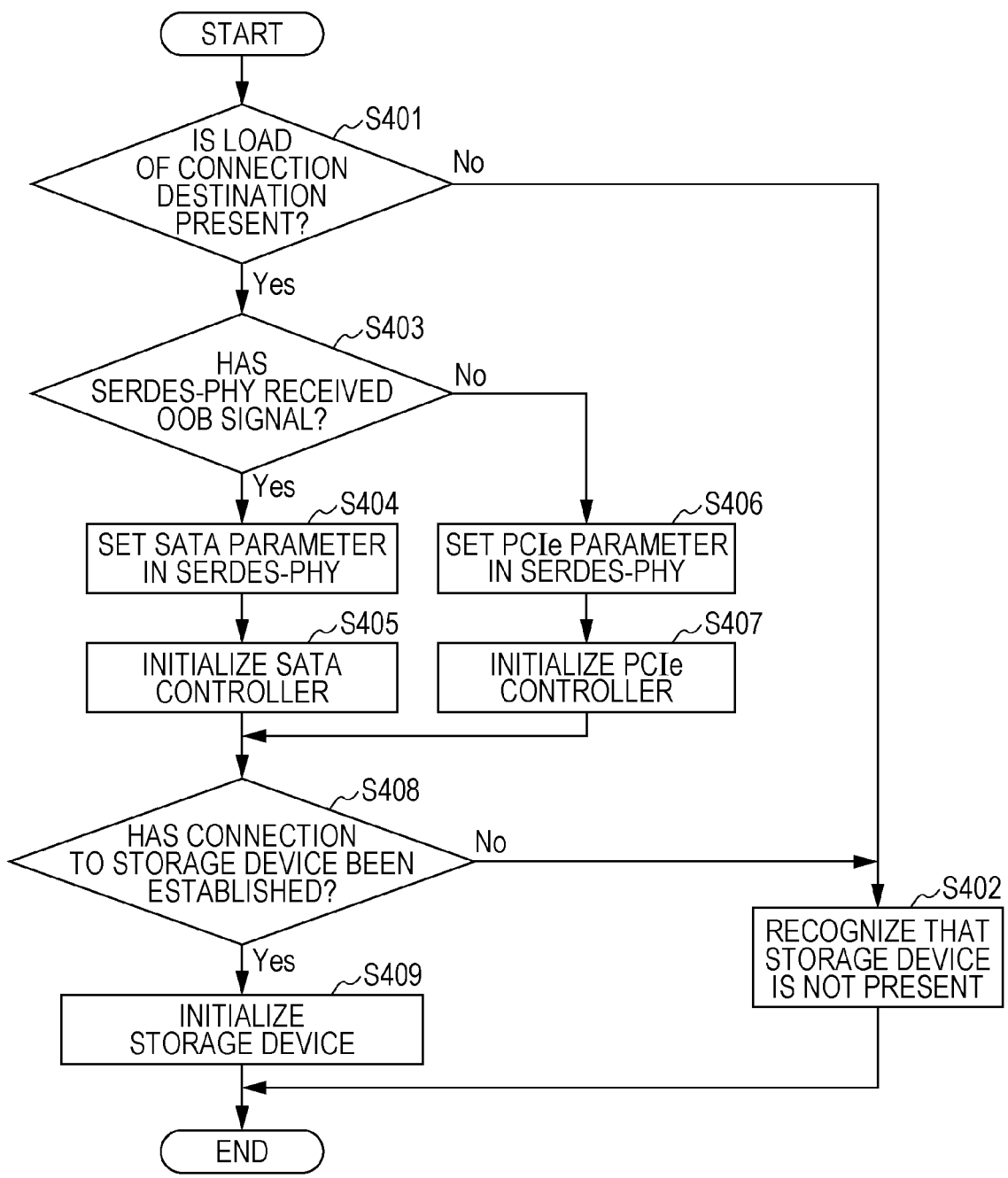
FIG. 15 is a flowchart illustrating an example of a procedure of switching the parameter to be used for connection between the ASSP and the storage device according to the other example of the second exemplary embodiment.

FIG. 15 is a flowchart illustrating an example of a procedure of switching the parameter to be used for the connection between the ASSP 422 and the storage device 421 according to the other example of the second exemplary embodiment.

First, processing of Step 401 and Step 402 is similar to the processing of Step 201 and Step 202 of FIG. 10 and therefore description thereof is omitted.

If the result of determination in Step 401 is "Yes", that is, if it is determined that the load of the connection destination is present, the OOB signal detecting part 532 determines whether the SERDES-PHY 431 has received the OOB signal (Step 403).

If the result of determination in Step 403 is "Yes", the parameter setting part 533 instructs the SERDES-PHY 431 to acquire the SATA parameter from the storage part (not illustrated). Then, the parameter setting part 533 sets the acquired SATA parameter in the SERDES-PHY 431 (Step 404). Next, the connection establishing part 534 initializes the SATA controller 429A (Step 405). After Step 405, the processing flow proceeds to Step 408 described later.

If the result of determination in Step 403 is "No", the parameter setting part 533 instructs the SERDES-PHY 431 to acquire the PCIe parameter from the storage part (not illustrated). Then, the parameter setting part 533 sets the acquired PCIe parameter in the SERDES-PHY 431 (Step 406). Next, the connection establishing part 534 initializes the PCIe controller 430A (Step 407). After Step 407, the processing flow proceeds to Step 408 described later.

After Step 405 or Step 407, the connection establishing part 534 determines whether the connection between the ASSP 422 and the storage device 421 has been established (Step 408). Processing of Step 408 and Step 409 is similar to the processing of Step 208 and Step 209 of FIG. 10 and therefore description thereof is omitted.

In this example, the connection between the ASSP 422 and the storage device 421 is established by switching the standard between SATA and PCIe based on the OOB signal as described above.

OTHER EXEMPLARY EMBODIMENTS

Although various exemplary embodiments and modified examples have been described above, those exemplary embodiments and modified examples may be combined with each other.

For example, in the first and second exemplary embodiments, SATA and PCIe are described as examples of the standard for establishing connection to the storage device 421. The connection standard is not limited to the two standards. For example, a USB standard may be used as the connection standard. In the other example of the first exemplary embodiment and the other example of the second exemplary embodiment, the OOB signal of SATA is detected. If there is a signal that may be detected in any other connection standard, the connection standard may be switched based on this signal.

The ASSP 422 that is used in the first and second exemplary embodiments is an example of an integrated circuit and any circuit board may be used as the circuit board of the integrated circuit that implements the functions of the ASSP 422.

In the first and second exemplary embodiments, the storage device 421 is provided inside the image forming apparatus 1 but may be provided outside the image forming apparatus 1.

In the first and second exemplary embodiments, the image forming apparatus 1 is described as an example but the exemplary embodiments are not limited to this configuration. The processing of switching the standard between SATA and PCIe may be implemented by another apparatus (for example, a PC) different from the image forming apparatus. In the case of the PC, if it is recognized that the storage device 421 is not present, the processing is terminated due to, for example, an error as described above.

The program that implements the exemplary embodiments of the present disclosure may be provided by communication means or by being stored in a recording medium such as a CD-ROM.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:
1. An electronic device, comprising:
a first controller compliant with a first storage standard;
a second controller compliant with a second storage standard;

a switching unit that switches setting information between first setting information corresponding to the first storage standard and second setting information corresponding to the second storage standard;

a connection establishing unit that executes processing of establishing connection between an external storage device and one of the first controller or the second controller, the one of the first controller or the second controller compliant with the setting information set by the switching of the switching unit;

a data transfer controller that controls data transfer between the external storage device and the one of the first controller or the second controller depending on the one of the first controller or the second controller through which the connection to the external storage device has been established by the connection establishing unit;

a first memory that is connected to the first controller and stores the first setting information; and a second memory that is connected to the second controller and stores the second setting information, wherein, if the connection establishing unit has established connection between the second controller and the external storage device, the data transfer controller limits a rate of the data transfer between the external storage device and the one of the first controller or the second controller so that the rate of the data transfer is equal to or lower than a predetermined upper limit value, wherein the switching unit switches the setting information between the first setting information stored in the first memory and the second setting information stored in the second memory.

2. The electronic device according to claim 1, wherein the switching unit switches the setting information to the second setting information if the connection has not been established first by using the first setting information, and wherein the switching unit switches the setting information to the first setting information if the connection has not been established first by using the second setting information.

3. The electronic device according to claim 2, wherein, if subsequent connection to the external storage device is established after connection between the first controller and the external storage device has been established, the switching unit switches the setting information to the first setting information in advance, and wherein, if subsequent connection to the external storage device is established after connection between the second controller and the external storage device has been established, the switching unit switches the setting information to the second setting information in advance.

4. The electronic device according to claim 2, wherein, if a predetermined signal from the external storage device has been detected, the switching unit switches the setting information to the first setting information in advance.

5. The electronic device according to claim 1, wherein the first setting information and the second setting information differ in terms of a setting value related to the data transfer.

6. The electronic device according to claim 5, wherein the setting value related to the data transfer is a setting value to be used for adjusting a strength of a data signal.

7. An electronic device, comprising:

a first controller compliant with a first storage standard;

a second controller compliant with a second storage standard;

a switching unit that switches setting information between first setting information corresponding to the first storage standard and second setting information corresponding to the second storage standard;

a connection establishing unit that executes processing of establishing connection between an external storage device and one of the first controller or the second controller, the one of the first controller or the second controller compliant with the setting information set by the switching of the switching unit; and a data transfer controller that controls data transfer between the external storage device and the one of the first controller or the second controller depending on the one of the first controller or the second controller through which the connection to the external storage device has been established by the connection establishing unit, wherein, if the connection establishing unit has established connection between the second controller and the external storage device, the data transfer controller controls data transfer from the external storage device to start earlier than in a case in which the connection establishing unit has established connection between the first controller and the external storage device.

8. The electronic device according to claim 7, further comprising an image forming unit that forms an image on a recording material based on image data, wherein, if the connection establishing unit has established the connection between the second controller and the external storage device, the data transfer controller controls transfer of the image data from the external storage device to the image forming unit to start earlier than in the case in which the connection establishing unit has established the connection between the first controller and the external storage device.

9. The electronic device according to claim 1, wherein the switching unit is connected to the first memory and the second memory and switches the setting information by switching a connection path between a connection path to the first memory and a connection path to the second memory.

10. The electronic device according to claim 9, wherein the switching unit is provided outside a circuit board having the first controller and the second controller.

11. The electronic device according to claim 1, wherein the switching unit is provided inside a circuit board having the first controller and the second controller.

12. The electronic device according to claim 11, wherein the switching unit acquires the first setting information or the second setting information to set the first setting information or the second setting information as the setting information.

13. An electronic device, comprising:

first control means compliant with a first storage standard;

second control means compliant with a second storage standard;

switching means for switching setting information between first setting information corresponding to the first storage standard and second setting information corresponding to the second storage standard;

connection establishing means for executing processing of establishing connection between an external storage device and one of the first control means or the second control means, the one of the first control means or the second control means compliant with the setting information set by the switching of the switching means;
a data transfer control means for controlling data transfer between the external storage device and the one of the first control means or the second control means depending on the one of the first control means or the second control means through which the connection to the external storage device has been established by the connection establishing mean;
a first memory that is connected to the first control means and stores the first setting information; and
a second memory that is connected to the second control means and stores the second setting information,
wherein, if the connection establishing means has established connection between the second control means and the external storage device, the data transfer control means limits a rate of the data transfer between the external storage device and the one of the first control means or the second control means so that the rate of the data transfer is equal to or lower than a predetermined upper limit value,
wherein the switching means switches the setting information between the first setting information stored in the first memory and the second setting information stored in the second memory.

* * * * *